United States Patent [19]

Roy

[11] Patent Number: 6,049,774
[45] Date of Patent: *Apr. 11, 2000

[54] MACHINE, METHOD AND MEDIUM FOR DYNAMIC OPTIMIZATION FOR RESOURCE ALLOCATION

[75] Inventor: Romanath Roy, Bridgewater, N.J.

[73] Assignee: AT&T Corp., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/676,757

[22] Filed: Jul. 8, 1996

[51] Int. Cl.[7] .............................. G06F 9/40; G06F 9/46; H04T 3/26

[52] U.S. Cl. ....................................... 705/8; 705/7; 705/9

[58] Field of Search ......................... 705/7, 8, 9

[56] References Cited

U.S. PATENT DOCUMENTS

| | | | |
|---|---|---|---|
| 3,643,034 | 2/1972 | Burns et al. | 379/244 |
| 3,931,476 | 1/1976 | Matthews | 379/22 |
| 4,744,027 | 5/1988 | Bayer et al. . | |
| 4,852,001 | 7/1989 | Tsushima | 364/401 |
| 4,866,628 | 9/1989 | Natajaran | 364/468 |
| 4,914,563 | 4/1990 | Karmarkar et al. . | |
| 5,006,983 | 4/1991 | Wayne | 364/401 |
| 5,077,661 | 12/1991 | Jain | 364/402 |

(List continued on next page.)

FOREIGN PATENT DOCUMENTS

| | | | |
|---|---|---|---|
| 0 306 965 A2 | 9/1988 | European Pat. Off. | G06F 15/60 |
| 0 669 586 A2 | 2/1995 | European Pat. Off. | G06F 17/60 |
| WO 95/26535 | 10/1995 | WIPO | G06F 17/60 |

OTHER PUBLICATIONS

Gerwood, G.J. and Robinson, A.C., Work Management System, British Telecommunications Engineering, pp204–210, Oct. 1991.

"An Algorithm for Designing Survivable Networks", AT&T Technical Journal, May/Jun. 1989, Y. K. Agarwal, author, pp. 64–76.

"An Application of Yield Management to the Hotel Industry Cosidering Multiple Day Stays", Authors: Birtan and Mondschein, Operations Research, vol. 43, No. 3, May–Jun. 1995, pp. 427–443.

"Coldstart: Fleet Assignment at Delta Airlines", Authors: Subramanian, Scheff, Jr., Quillinan, Wiper, and Marsten, Published: The Institute of Management Sciences, Transportation–Air; Interfaces 24: Jan.–Feb. 1994, pp. 104–120.

"Evolutionary Change in Product Management: Experiences in the Car Rental Industry", Authors: Carroll and Grimes, 1995 Institute for Operations Research, Transportation–Road, Interfaces 25; Sep.–Oct. 1995, pp. 84–104.

"Network Planning With Random Demand", Authors: Sen, Doverspike and Cosares, Abstract, Dec. 1992, Grant No. NSF–DDM9114352, National Science Foundation.

"Optimal Expansion of Fiber–Optic Telecommunications Networks in Metropolitan Areas", Authors Cox Jr., Kuehner, Parrish and Qiu, 1993 The Instutute of Management Sciences, Facilities/Equipment Planning–Capacity Expansion, Interfaces 23: Mar.–Apr. 1993, pp. 35–48.

"Yield Management At American Airlines", Barry C. Smith, John F. Leimkuhler, Ross M. Darrow; Interfaces 22: Jan. 1–Feb. 1992, pp. 8–31, (American Airlines Decision Technologies, Texas).

*Primary Examiner*—Tod R. Swann
*Assistant Examiner*—James W. Myhre

[57] ABSTRACT

A machine, method and medium for allocating resources over given time periods. Various requests (e.g., from customers) are received for products and/or services, and a preferred scheme for allocating resources, over a plurality of time periods, to provide the requested products and/or services, is determined. Marketing, procurement and production processes are taken into account in the analysis. The end result is a set of systems indicating how the resources should be deployed over the various time periods to satisfy customer demand.

25 Claims, 11 Drawing Sheets

U.S. PATENT DOCUMENTS

| | | | |
|---|---|---|---|
| 5,109,529 | 4/1992 | Akaiwa | 455/513 |
| 5,111,391 | 5/1992 | Fields | 364/401 |
| 5,136,538 | 8/1992 | Karmarkar et al. | |
| 5,144,425 | 9/1992 | Joseph | 348/419 |
| 5,155,679 | 10/1992 | Jain | 364/402 |
| 5,216,593 | 6/1993 | Dietrich | 364/402 |
| 5,237,497 | 8/1993 | Sitarski | 364/402 |
| 5,255,184 | 10/1993 | Hornick et al. | |
| 5,270,921 | 12/1993 | Hornick. | |
| 5,291,394 | 3/1994 | Chapman | 705/8 |
| 5,291,397 | 3/1994 | Powell | 364/402 |
| 5,295,065 | 3/1994 | Chapman | 364/401 |
| 5,392,429 | 2/1995 | Agrawal | 395/650 |
| 5,404,291 | 4/1995 | Kerr et al. | |
| 5,442,730 | 8/1995 | Bigus | 395/22 |
| 5,467,268 | 11/1995 | Sisley | 364/401 |
| 5,515,367 | 5/1996 | Cox, Jr. et al. | 370/60.1 |
| 5,590,133 | 12/1996 | Billstrom et al. | 370/349 |
| 5,598,532 | 1/1997 | Liron | 395/200.01 |
| 5,790,862 | 8/1998 | Tanaka et al. | 395/705 |
| 5,870,477 | 2/1999 | Sasaki et al. | 713/165 |

FIG. 5

| PRODUCTS/ SERVICES (m) | TERTIARY RESOURCE COMPONENTS (l) | SECONDARY RESOURCE COMPONENTS (h) | PRIMARY RESOURCE COMPONENTS (i) | ROUTE (j) | DEMAND LOCATIONS (k) |
|---|---|---|---|---|---|
| VG/ASDS ACCUNET T1.5 NODAL T1.5 | T1 MULTIPLEXER (MULTIPLE) NONE NONE | DS3 MULTIPLEXERS (MULTIPLE) | HIGH CAP FACILITIES (n x DS3) e.g. 3-PACK 6-PACK, ETC. | DIRECT VIA HUB | LEC OFFICE |
| VG/ASDS ACCUNET T1.5 NODAL T1.5 | T1 MULTIPLEXER (MULTIPLE) NONE NONE | SINGLE DS3 MULTIPLEXER | SINGLE HIGH CAP FACILITY (1 x DS3) | DIRECT VIA HUB | LEC OFFICE |
| VG/ASDS | SINGLE T1 MULTIPLEXER | NONE | SINGLE T1 FACILITY | DIRECT VIA HUB | LEC OFFICE |
| VG/ASDS | NONE | NONE | VG/ASDS FACILITY | STANDALONE | LEC OFFICE |
| ACCUNET T1.5 | NONE | NONE | ACCUNET T1.5 FACILITY | STANDALONE | LEC OFFICE |
| NODAL T1.5 | NONE | NONE | NODAL T1.5 FACILITY | STANDALONE | LEC OFFICE |

FIG. 6A

| MIGRATION OF VG/ASDS SERVICES | | MIGRATION OF ACCUNET T1.5/NODAL T1.5 SERVICES | |
|---|---|---|---|
| i | i' OR i(%) | i | i' OR i(%) |
| INITIAL INV. OF T1.5 | -STANDALONE VG/ASDS | INIT. INV. OF 1 x DS3 FACILITY | -STANDALONE ACCUNET/ NODAL |
| INITIAL INV. OF 1 x DS3 FACILITY | -STANDALONE VG/ASDS<br>-VG/ASDS CARRIED BY INIT. INV. OF T1.5 | INIT. INV. OF 3 x DS3 FACILITY | -STANDALONE ACCUNET/NODAL<br>-ACCUNET/ NODAL CARRIED BY INI. INV. OF 1 x DS3 |
| INITIAL INV. OF 3 x DS3 FACILITY | -STANDALONE VG/ASDS<br>-VG/ASDS CARRIED BY INIT. INV. OF T1.5<br>-VG/ASDS CARRIED BY INIT. INV. OF 1 x DS3 FACILITY | INIT. INV. OF 12 x DS3 FACILITY | -STANDALONE ACCUNET/NODAL<br>-ACCUNET/ NODAL CARRIED BY INI. INV. OF 1 x DS3<br>-ACCUNET/ NODAL CARRIED BY INI. INV. OF 3 x DS3 |
| INITIAL INV. OF 12 x DS3 FACILITY | -STANDALONE VG/ASDS<br>-VG/ASDS CARRIED BY INIT. INV. OF T1.5<br>-VG/ASDS CARRIED BY INIT. INV. OF 1 x DS3 FACILITY<br>-VG/ASDS CARRIED BY INIT. INV. OF 3 x DS3 | NEW 1 x DS3 FACILITY | -STANDALONE ACCUNET/NODAL |

FIG. 6B

| MIGRATION OF VG/ASDS SERVICES | | MIGRATION OF ACCUNET T1.5/NODAL T1.5 SERVICES | |
|---|---|---|---|
| i | i' OR i(%) | | i' OR i(%) |
| NEW 12 x DS3 FACILITY | -STANDALONE VG/ASDS<br>-VG/ASDS CARRIED BY INI. INV. OF T1.5<br>-VG/ASDS CARRIED BY INI. INV. OF 1 x DS3 FACILITY<br>-VG/ASDS CARRIED BY INI. INV. OF 3 x DS3 FACILITY<br>-VG/ASDS CARRIED BY NEW T1.5<br>-VG/ASDS CARRIED BY NEW 1 x DS3<br>-VG/ASDS CARRIED BY NEW 3 x DS3 | | |

FIG. 6C

| MIGRATION OF VG/ASDS SERVICES | | MIGRATION OF ACCUNET T1.5/NODAL T1.5 SERVICES | |
|---|---|---|---|
| i | i' OR i(s) | i | i' OR i(s) |
| NEW T1.5 | -STANDALONE VG/ASDS | | |
| NEW 1 x DS3 FACILITY | -STANDALONE VG/ASDS<br>-VG/ASDS CARRIED BY INI. INV. OF T1.5<br>-VG/ASDS CARRIED BY NEW T1.5 | NEW 3 x DS3 FACILITY | -STANDALONE ACCUNET/NODAL<br>-ACCUNET/NODAL CARRIED BY INI. INV. OF 1 x DS3<br>-ACCUNET/NODAL CARRIED BY NEW 1 x DS3 |
| NEW 3 x DS3 FACILITY | -STANDALONE VG/ASDS<br>-VG/ASDS CARRIED BY INI. INV. OF T1.5<br>-VG/ASDS CARRIED BY INI. INV. OF 1 x DS3 FACILITY<br>-VG/ASDS CARRIED BY NEW T1.5<br>-VG/ASDS CARRIED BY NEW 1 x DS3 FACILITY | NEW 12 x DS3 FACILITY | -STANDALONE ACCUNET/NODAL<br>-ACCUNET/NODAL CARRIED BY INI. INV. OF 1 x DS3<br>-ACCUNET/NODAL CARRIED BY INI. INV. OF 3 x DS3<br>-ACCUNET/NODAL CARRIED BY NEW 1 x DS3<br>-ACCUNET/NODAL CARRIED BY NEW 3 x DS3 |

MACHINE, METHOD AND MEDIUM FOR DYNAMIC OPTIMIZATION FOR RESOURCE ALLOCATION

BACKGROUND OF THE INVENTION

1. Field of the Invention

The present invention relates to a machine, method and medium for allocating resources over a plurality of time periods, taking into account a plurality of interrelated processes such as marketing, procurement and production.

2. Related Art

Today's businesses generally includes a procurement process, production process, and marketing process. The standard practice of these businesses is to optimize each of these processes separately with little or no regard to inter-dependencies among processes. Individual process decision is made in a disjointed manner with no consideration to the total business operation. Though manual handoffs exist, it is very poorly linked and contrary to best-in-class technology. This has created problems of inefficiency in most large and mid-size corporations. In addition to a lack of consideration of sufficient interdependencies, each process is optimized separately using static optimization techniques such that a system (comprising products or services made up of various resources and configured based upon customer demand) designed for a given time period t is not interdependent with systems designed for, e.g., times t+1 or t−1. In effect, the problem with the static optimization causes a business process to make reactive business decisions as opposed to proactive business decisions.

Thus, the problem existing with the majority of optimization tools existing today in industries is that they are based on static optimization algorithms that do not reflect true costs or provide any competitive advantage in the face of fierce competition in various markets. This is because the competition influences the elasticity of demand and price and makes the overall business environment very dynamic. For example, fluctuating demand in retail industries has a continuous impact on the shipping schedule among suppliers, warehouses and retail stores. In the auto industry, changes in demand at the sales outlets have a bearing on the production floor schedules and procurement of spare parts. However, the frequency of change and variables of change differ from one industry to the other. In telecommunication services industry, changes in demand similarly have an impact on the existing capacity, procurement of additional capacity or production operation.

As competition rises in markets in the coming decades, companies will demand more real time information of resource costs and competitive pricing. Static optimization, however, only yields a cost-optimal system in a snap-shot of time, usually at present, without regard to future growth or decline in any service type, time value of money, introduction of new technology or change in customer demographics. The problem with the static, optimization is that what is optimum today may not be optimum tomorrow. It causes a business to make reactive business decisions as opposed to proactive business decisions. It also relies heavily on human judgement and involvement and calls for creation of many unnecessary subprocesses within a business process or many unnecessary processes within a business. Business decisions that are made based on many of these business processes, are poor and sub-optimal with respect to a multi-year planning horizon. Specifically, when a static optimization technique is run at time period zero (i.e. now), it cannot solve resource rearrangement problems for future time periods.

It is true that current static optimization techniques can analyze a future time period as if it were the current time period (i.e. time period t=0). However, this still only deals with a single period, and does not take into account that effect that other time periods will have on it. Being in the current time period, this technique cannot produce optimal decisions that will occur at future time periods. Nonetheless, utilization of such static techniques have been the standard practice of businesses and industries. For example, retail, manufacturing, telecommunications and service industries rely heavily on static optimization techniques.

In the airline industry, an optimum fleet schedule is very important to the financial well-being of this industry. Efforts to enhance efficiency and charge "the right" price for seats have been the subject of reports such as "Yield Management at American Airlines" by Smith et al. However these reports (and the airline industry, generally), nonetheless applies mostly static optimization techniques. This leaves them vulnerable to the inelement business conditions for future time periods. Knowing about optimal business activities of the future time periods will put any business at a competitive edge. This is why a static optimization is not adequate in fiercely competitive marketplace.

Some industries referred to above that do not apply strictly "static" optimization instead utilize "pseudo-dynamic" optimization which is sometimes misconstrued as true dynamic optimization. Though the pseudo-dynamic optimization is also based on a multi-period planning horizon, many characteristics of static optimization heavily bias the results of this pseudo-dynamic optimization. For example, the output of static optimization is used as input to pseudo-dynamic optimization. Sometimes the results of static optimization are used to approximate the future activities at a very macro-level which can be significantly sub-optimal. This again calls for creation of additional business processes and more human intervention to respond to the business conditions in more reactive manner.

Thus, what is needed is a scheme for using dynamic optimization techniques such that systems contemplated for implementation at various times are interrelated, and that the procurement, production and marketing processes are inter-related as well.

SUMMARY OF THE INVENTION

The present invention overcomes the deficiencies of the above-noted schemes by providing a machine, method and medium for allocating resources over given time periods. Specifically, the present invention receives various requests (e.g., from customers) for products and/or services, and determines a preferred scheme for allocating resources, over a plurality of time periods, to provide the requested products and/or services. Marketing, procurement and production processes are taken into account in the analysis. The end result is a set of systems indicating how the resources should be deployed over the various time periods to satisfy customer demand. In doing this, the interrelationships between the time periods are taken into account, and a desired pricing scheme for the various products and services delivered (which may vary from time period to time period) is determined.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which:

FIGS. 5–6 are charts representing a specific test implementation in the telecommunications area as implemented by some embodiments of the present invention.

DETAILED DESCRIPTION

Figure 1:
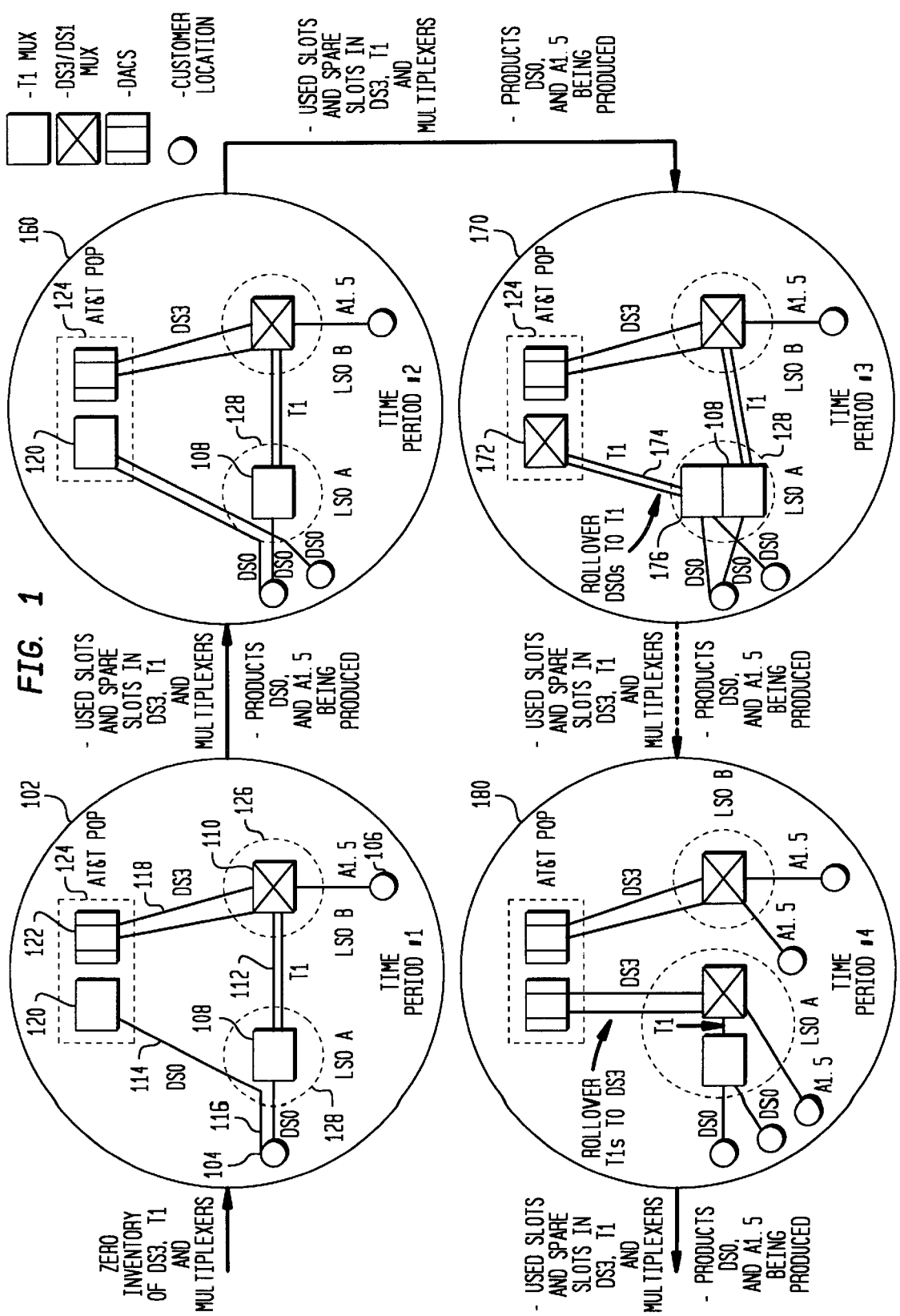
FIG. 1 depicts a specific telecommunications example implemented as a result of some embodiments of the present invention.

The present invention relates to a machine, method and medium for allocating resources over a plurality of time periods, taking into account a plurality of interrelated processes such as marketing, procurement and production.

As indicated in the Background section above, surviving in any competitive environment requires real-time integration of fundamental business processes such as procurement, engineering, production operation, marketing and sales. Such integration will allow flow of materials and information from process to process on a real-time basis. A multi-period dynamic optimization technique assures that flow of materials and information occurs in a cost-optimal way. In addition, "yield management" techniques can also be applied to stem fierce competition.

The utilization of capacity in a production-ready resource is driven by demand of different products or services. For example, customers sometimes do not like certain products or services and might return them sooner or after a period of using them if a return policy allows. The nature of returning products or services might vary from industry to industry. Certain products or services can never be returned. Customers sometimes leave or go to competitors for pricing reasons, technological reasons, political reasons, etc. Existing resource capacities carried from the previous time period also need to be considered for allocation. Decline in demand of some products or services might create idle resource capacities, some of which might come back to inventory for use.

In some embodiments contemplated by the present invention, a dynamic systems model is used to create systems containing the aforementioned products or services, over a plurality of time periods. Within each time period, the way in which products or services flow from one, e.g., production plant or warehouse to another or from one process to the other are additional dimensions of the model. The products or services that are currently occupying a particular resource capacity or a series of resource capacities in a given time period might migrate to a different resource capacity or series of resource capacities in another time period.

The above concepts as applied to, for example, the telecommunications industry, will be primarily discussed below. It should be understood, however, that the present invention contemplates application in any number of other industries and technologies as well.

Thus, using a telecommunications industry example, the routing of a data circuit via certain network nodes and network facilities (each of which is an example of a resource) might be optimal in one time period to provide a certain service, but not optimal in another time period due to fluctuations of demand or other competing resources. The same data circuit might be rerouted through a different set of network nodes or facilities in another time period. Circuit demand also requires flow of optimal network facilities and network apparatus at different network nodes. Such a flow is taking place across procurement, engineering and production operation to support sales and marketing in a given time period.

As can be appreciated from the above, it is contemplated that the various requirements of customers over a plurality of time periods are taken into account, as is the "inventory" situation regarding availability of the resources needed to fulfil customer needs. Thus, marketing, procurement and production over the time periods all need to be taken into account. In that way, systems that need to be implemented over various time periods can be mapped out and planned, all at once, in advance. Naturally, there is some change to be expected as, for example, customers cancel orders, etc. Nonetheless, a relatively accurate picture of how systems will be implemented over a plurality of future time periods can be anticipated with significant accuracy and efficiency, so that a company can anticipate how it should prepare to allocate resources. The specific implementation of this concept will be discussed in greater detail with regard to various equations and flow charts described further below.

FIG. 1 depicts an example of a specific multi-period dynamic systems model concerning telecommunications technology, illustrating the effects of the present invention. Referring to FIG. 1, the four "bubbles" represent systems within four different discrete time periods (1, 2, 3 and T). Within each time period "bubble" are various resources used to configure products or services requested by customers.

Referring to time period 1 (102) as an example, a Point Of Presence (POP) 124 is shown. A POP can be defined as a major circuit office into which large numbers of circuits (e.g., telephone lines) can feed into, and from which smaller lines typically emanate. Three types of lines often used are DS0 lines (often referred to as "voice grade"), T1 lines (which have 24 times the bandwidth as a DS0 line) and DS3 lines (which have 28 times the bandwidth as T1 lines).

Theoretically, each customer could be directly attached to the POP 124, but that would create great inefficiencies. Consequently, local serving offices (LSOs) can be created, typically containing multiplexers of some type. These multiplexers allow conversion from a line of relatively large bandwidth to multiple lines of smaller bandwidth. Thus, for example, a DS3/DS1 multiplexer 110 is shown converting a DS3 to a T1 (and, although not shown, is capable of having another 27 T1 lines attached to it). Similarly, T1 multiplexer 108 is shown converting the T1 line to a DS0 line (and is capable of converting another 23).

The "end product" in this example are the products and services received by customer locations, such as those shown at 104 and 106. Here, the service that customer location 106 receives is an A1.5 circuit (which has the bandwidth of a T1 line), and customer 104 receives a DS0 circuit. As can be appreciated, depending upon demand, each DS3/DS1 multiplexer can be thought of as having a capacity of 28 T1 (or A1.5) "slots" (i.e., line inputs), and thus if 20 of them are being used, it has 8 to spare. Similarly, the T1 multiplexer has a capacity of 24 DS0 lines it can provide to customers.

At time period 2 (160), additional DS0 lines (in this case, representing services to customers) have been added to T1 multiplexer 120. There are not, however, enough DS0 lines to warrant putting in a T1 line directly between the POP 124 and LSO 128. In any event, some embodiments of the present invention keep track of, and account for, the used and spare "slot" in the various multiplexers, as well as the facilities (e.g., cables and multiplexers) themselves, when setting up products and services of time period 2 (160). Also, where necessary, in the event that the required resources do not exist at time period 2 (i.e., they were not available to be carried over from the previous time period, or there was no spare because all slots were used), then they must be produced. Thus, in time period 2, while there are enough "slots" within, say, T1 multiplexer 120 to service the additional customer locations with DS0 services, additional DS0 cables are needed. While there is no "carry-over" of this resource as there are for the slots in the T1 multiplexer 120, this one actually has to be procured from another source (e.g., obtained from a different location, bought, manufactured, etc.).

At time period 3 (170), it can be seen that there was enough of a demand between POP 124 and LSO 128 (which included T1 multiplexer 108) to warrant the installation of a T1 line 174. Note that what was T1 multiplexer 120 during time period 2 is now a DS3/DS1 multiplexer 172. In addition, an additional T1 multiplexer 176 was warranted. Thus, that additional resource does not pass from the previous time period (i.e., it did not exist at that previous time period, as did multiplexer 108), and thus needs to be obtained, manufactured, etc. Though not explicitly shown, the additional T1 multiplexer 176 is a result of additional customer demand for more DS0 lines (i.e., more DS0 services).

Lastly, time period T (180) shows the result of even additional demand, where even more and higher-band width multiplexers are required within the system to supply customers with desired services.

The resources that can be used to implement various products and services as contemplated by some embodiments of the present invention can be classified in various orders of criticality. The ranking of a particular resource depends upon its necessity as a component of a given product or service, and is contemplated to be assigned a ranking based on some logical criteria. As an example, resources can be assigned as primary, secondary or tertiary. In the telecommunications example above for time period 1 (102), in order to provide the A1.5 service to customer location 106, it may be logical to designate the A1.5 standalone line as a primary resource, since it is absolutely needed. The DS3 multiplexer 110 can be thought of as secondary, since that particular component is not as important (e.g., the A1.5 line could, potentially, come directly from the POP 124). Then, the T1 multiplexer 108 could be thought of as tertiary, since it is potentially of some, but less importance. Of course, it should be understood that the present invention contemplates that resources can be ranked in various different ways and to various numbers of degrees.

With the above in mind, a generalized mathematical systems model follows:

A Generalized Mathematical Model

Let the primary resources be represented by a set of vectors as $(\alpha_d^c, \alpha_o^c, \alpha_p^c)$ where c signifies whether it is in the existing inventory or to be procured. c=0 means the resource is in the existing inventory and c=1 means the resource is to be either leased or purchased. The αs with subscripts, d, o and p, denote different types of primary resources. $\alpha_d^c$ represents standalone primary resources which are utilized for direct channel production operation and product or service distribution. These primary resources need not be assembled with any secondary or tertiary resource components to support the production of products or services. Each unit of these primary resources generally produces a unit of products or services and, therefore, is very expensive for mass production. $\alpha_o^c$ represents a type of primary resources which are assembled with tertiary resource components to support lass production of a specific type of products or services. Thus, unit cost of producing this type of products or services becomes cheaper. $\alpha_p^c$ represents primary resources which need to be assembled with both secondary resource components and tertiary resource components in a cascading manner to support mass production of multiple types of products or services, and, consequently, reduce the unit cost of production even further. In the following mathematical model, i is used as a subscript to indicate an element in the vector representing any of the above types of primary resources. The aforementioned secondary and tertiary resource components are denoted by two sets of vectors, $\beta^c$ and $\gamma^c$, respectively. Two indices, h and l, are used to indicate secondary resource components and tertiary resource components respectively. The types of assemblies among primary, secondary and tertiary resources determine what kinds of products or services are produced. For example, assembly of $\alpha_o^c$ primary resources with $\gamma^c$ tertiary resources produces bulk quantities of products or services which can be symbolized by $\rho_g$ vector. These same products or services, $\rho_g$, can also be produced in bulk quantities if primary resources, $\alpha_p^c$, are assembled with secondary resources, $\beta^c$, which are then assembled with tertiary resources, $\gamma^c$. On the other hand, assembly of primary resources, $\alpha_p^c$, with secondary resource components, $\beta^c$, produces bulk quantities of products or services, which can be symbolized by $\rho_f$ vector. The m subscript is used to identify an element belonging to one of these product or service vectors i.e. m $\in (\rho_g, \rho_f)$. There are also different types of warehouses, production plants or distribution routes for which j is an index. In this model, j is of two types, standalone and bulk denoted by $v_d$ and $v_b$, respectively. Warehouses, production plants or distribution routes that are associated with standalone primary resources, $\alpha_d^c$, are designated by vector, $v_d$. Warehouses, production plants or distribution routes that are associated with primary resources, $\alpha_o^c$ and $\alpha_p^c$, are designated by vector, $v_b$. An important aspect of a dynamic resource allocation problem is rearrangement activity, r. Products or services, m, which are assigned to primary resource i of the j-th warehouse, production plant or distribution route in one time period can migrate to primary resource i of warehouse, production plant or distribution route j in another time period to maintain cost-optimal production process, where $(j=j)\cup(j\neq j)$. i can also be represented by $i(\delta)$ which implies that products or services produced by δ primary resources in production plant or distribution in route j in one time period, can migrate to primary resource $i \in \alpha$ of production plant or distribution route j in another discrete time period when $i \neq i$ and $(j=j)\cup(j\neq j)$. t defines a time period and k is used to indicate customer demand locations for products or services, $\rho=(\rho_g, \rho_f)$. Let us assume that t=1, 2, ..., T; j=1, 2, ..., J; k=1, 2, ..., K; m=1, 2, ..., M; and i=1, 2, ..., I where $i \in (\alpha_d^c, \alpha_o^c, \alpha_p^c)$. Eight types of mathematical equations, which lay the foundation for solving a truly dynamic resource allocation problem, are presented below. These types of core equations offer the basic properties required to mimic the physical phenomena across business processes such as, marketing & sales, production and procurement. These equations can be categorized as objective function, procurement or spare balance equation, usage balance equation, product or service inventory equation, product or service demand equation, rearrangement equation, decision equation to rearrange or not to rearrange and initial inventory equation. In addition to these equations, non-negativity and integer constraints are to be applied.

1. The Linear Objective Function

The objective function is to be minimized. The cost coefficients have been converted to net present value over a planning horizon for a given interest rate.

Minimize Z = (1)

$$\sum_t \sum_{j \in v_b} \sum_k \sum_{m \in \rho_g} \sum_l \sum_h \sum_{i \in \alpha_p^c} (\varepsilon_{tjkmlhi} \cdot x_{tjkmlhi} + \varepsilon'_{tjkmlhi} \cdot \zeta_{tjkmlhi}) +$$

$$\sum_t \sum_{j \in v_b} \sum_k \sum_{m \in \rho_g} \sum_l \sum_{i \in \alpha_o^c} (\varepsilon_{tjkmli} \cdot x_{tjkmli} + \varepsilon'_{tjkmli} \cdot \zeta_{tjkmli}) +$$

$$\sum_t \sum_{j \in v_b} \sum_k \sum_{m \in \rho_f} \sum_h \sum_{i \in \alpha_p^c} (\varepsilon_{tjkmhi} \cdot x_{tjkmhi} + \varepsilon'_{tjkmhi} \cdot \zeta_{tjkmhi}) +$$

$$\sum_t \sum_{j \in v_d} \sum_k \sum_{m \in (\rho_g, \rho_f)} \sum_{i \in \alpha_d^c} (\varepsilon_{tjkmi} \cdot x_{tjkmi} + \varepsilon'_{tjkmi} \cdot \zeta_{tjkmi}) +$$

$$\sum_t \sum_{j \in v_b} \sum_k \sum_{m \in \rho_g} \sum_l \sum_h \sum_{i \in \alpha_p^c} \sum_{i' \in i(\delta)} \sum_{j'} \lambda_{tjkmlhi,i',j'} \cdot r_{tjkmlhi,i',j'} +$$

$$\sum_t \sum_{j \in v_b} \sum_k \sum_{m \in \rho_g} \sum_l \sum_{i \in \alpha_o^c} \sum_{i' \in i(\delta)} \sum_{j'} \lambda_{tjkmli,i',j'} \cdot r_{tjkmli,i',j'} +$$

$$\sum_t \sum_{j \in v_b} \sum_k \sum_{m \in \rho_g} \sum_h \sum_{i \in \alpha_p^c} \sum_{i' \in i(\delta)} \sum_{j'} \lambda_{tjkmhi,i',j'} \cdot r_{tjkmhi,i',j'} +$$

$$\sum_{i \in \alpha_p^c} \sum_h \sum_l \sum_{j \in v_b} \sum_t \mu_{ihljt} \cdot R_{ihljt} + \sum_{i \in \alpha_o^c} \sum_l \sum_{j \in v_b} \sum_t \mu_{iljt} \cdot R_{iljt} +$$

$$\sum_{i \in \alpha_p^c} \sum_h \sum_{j \in v_b} \sum_t \mu_{ihjt} \cdot R_{ihjt} + \sum_{i \in (\alpha_d^c, \alpha_o^c, \alpha_p^c)} \sum_{j \in (v_b, v_d)} \sum_t \mu_{ijt} \cdot R_{ijt} +$$

$$\sum_{i \in \alpha_p^c} \sum_h \sum_l \sum_{j \in v_b} \sum_t \xi_{ihljt} (S_{ihljt} + U_{ihljt}) +$$

$$\sum_{i \in \alpha_o^c} \sum_l \sum_{j \in v_b} \sum_t \xi_{iljt} (S_{iljt} + U_{iljt}) +$$

$$\sum_{i \in \alpha_p^c} \sum_h \sum_{j \in v_b} \sum_t \xi_{ihjt} (S_{ihjt} + U_{ihjt}) +$$

$$\sum_{i \in (\alpha_d^c, \alpha_o^c, \alpha_p^c)} \sum_{j \in (v_b, v_d)} \sum_t \xi_{ijt} (S_{ijt} + U_{ijt})$$

where $\epsilon_{tjkmlhi}$=unit cost of producing a product or service, m∈$\rho_g$, in plant or warehouse j and supported by tertiary resource components, l, secondary resource components, h, and primary resource components, i $\epsilon_{tjkmlhi}$=unit cost of holding a product or service, m∈$\rho_g$ in plant or warehouse j and supported by tertiary resource components, l, secondary resource components, h, and primary resource components, i $\epsilon_{tjkmli}$=unit cost of producing a product or service, m∈$\rho_g$ in plant or warehouse j and supported by tertiary resource components, l, and primary resource components, i $\epsilon_{tjkmli}$=unit cost of holding a product or service, m∈$\rho_g$ in plant or warehouse j and supported by tertiary resource components, l, and primary resource components, i $\epsilon_{tjkmhi}$=unit cost of producing a product or service, m∈$\rho_f$, in plant or warehouse j and Supported by secondary resource components, h, and primary resource components, i $\epsilon_{tjkmhi}$=unit cost of holding a product or service, m∈$\rho_f$, in plant or warehouse j and supported by secondary resource components, h, and primary resource components, i $\epsilon_{tjkmi}$=unit cost of producing a product or service, m∈($\rho_g$, $\rho_f$) in plant or warehouse, j∈$v_d$, and supported by primary resource components, i∈$\alpha_d^c$, $\epsilon_{tjkmi}$=unit cost of holding a product or service, m∈($\rho_g$, $\rho_f$) in plant or warehouse, j∈$v_d$, and supported by primary resource components, i∈$\alpha_d^c$, $\lambda_{tjkmlhi,i'j}$=unit cost of migrating a product or service, m∈$\rho_g$, from i'∈i($\delta$) of plant j' to i∈$\alpha_p^c$ of plant j which requires both tertiary resource components l and secondary resource components h $\lambda_{tikamli,i'j}$=unit cost of migrating a product or service, m∈$\rho_g$, from i'∈i($\delta$) of plant j' to i∈$\alpha_o^c$ of plant j which requires tertiary resource components l.

$\lambda_{tjkmhi,i'j}$=unit cost of migrating a product or service, m∈$\rho_f$, from i'∈i($\delta$) of plant j' to i∈$\alpha_p^c$ of plant j which requires secondary resource components h.

$\mu_{ihljt}$=unit cost of tertiary resource components l which is assembled with secondary resource components h which is then assembled with primary resource components i∈$\alpha_p^c$ $\mu_{iljt}$=unit cost of tertiary resource components l which is assembled with primary resource components i∈$\alpha_o^c$ $\mu_{ihjt}$=unit cost of secondary resource components h which is assembled with primary resource components i∈$\alpha_p^c$ $\mu_{ijt}$=unit cost of primary resource components i∈($\alpha_d^c$, $\alpha_o^c$, $\alpha_p^c$)

$\xi_{ihljt}$=unit cost of holding a slot, spare or used, in a tertiary resource component l which is assembled with secondary resource components h which is them assembled with primary resource components i∈$\alpha_p^c$ $\xi_{iljt}$=unit cost of holding a slot, spare or used, in a tertiary resource component l which is assembled with primary resource components i∈$\alpha_o^c$ $\xi_{ihjt}$=unit cost of holding a slot, spare or used, in a secondary resource component h which is assembled with primary resource components i∈$\alpha_p^c$ $\xi_{ijt}$=unit cost of holding a slot, spare or used, in primary resource components i∈($\alpha_d^c$, $\alpha_o^c$, $\alpha_p^c$)

x=demand-driven activity quantities, $\zeta$=product or service inventory quantities, r=rearrangement activity quantities, R=new resource quantities, S=spare resource quantities, U=used resource quantities, T=capacity of a unit of resource.

2. Procurement/Spare Balance Equations

These equations drive procurement decisions. It provides with optimal purchase or lease decisions of tertiary, secondary and primary resource components. If spares exist in the existing inventory of these resources being carried from (t−1) period, products or services utilize these spares in the existing production capacity before deciding to purchase or lease any additional resource components.

Tertiary Resource Components:

The equation (2) determines the number of tertiary resource components, $R_{ihljt}$ required to support m∈$\rho_g$ products or services. Both demand variables x and rearrangement variables r are two main drivers to size the tertiary resource components, l∈$\gamma^c$. These tertiary components are assembled with secondary components, $h \in \beta^c$ which are also assembled with primary resource components $i \in \alpha_p^c$.

$$\sum_k \sum_{m \in \rho_g} \left\{ x_{tjkmlhi} + \sum_{i' \in \delta} \sum_{j'} r_{tjkmlhi,i',j'} \right\} + S_{ihljt} = T_l \cdot R_{ihljt} + S_{ihlj(t-1)} \quad (2)$$

when $l \in \gamma^0$, $T_l \cdot R_{ihljt} = 0$ and $l \in \gamma^1$, $R_{ihljt}$ might have a positive value. j is associated with warehouses, plants or routes where concentration of producing various products or services m takes place, i.e. $j \in v_b$. j refers to all possible warehouses, plants or routes including j.

Equation (3) sizes the number of tertiary resource components, $R_{iljt}$ which can be assembled with primary resource components $i \in \alpha_o^c$ to produce products or services $m \in \rho_g$. The equation also keeps track of spare slots, $S_{iljt}$ at time period t. All spares are used first before new tertiary resource components can be purchased or leased.

If $l \in \gamma^0$, $T_l \cdot R_{iljt} = 0$ and if $l \in \gamma^1$, $R_{iljt}$ might have a positive integer value.

$$\sum_k \sum_{m \in \rho_g} \left\{ x_{tjkmli} + \sum_{i' \in \delta} \sum_{j'} r_{tjkmli,i',j'} \right\} + S_{iljt} = T_l \cdot R_{iljt} + S_{ilj(t-1)} \quad (3)$$

when $i \in \alpha_o^c$ where j is associated with warehouses, plants or routes producing a large concentration of various products or services m, i.e. $j \in v_b$. j refers to all possible warehouses, plants or routes including j.

Secondary Resource Components:

The number of tertiary resource components, $R_{ihljt}$, estimated from equation (2), demand-driven variables x and rearrangement variables r drive the number of secondary resource components $R_{ihjt}$. The tertiary resource components l cascade into secondary resource components h which can then cascade into primary resource components i to support products or services $m \in \rho_g$. Additionally, assembly of secondary resource components h with primary resource components i produces products or services $m \in \rho_f$. Equation (4) comprises of such variables as well as spare balances of production slots in secondary resource components.

$$R_{ihljt} + \sum_k \sum_{m \in \rho_f} \left\{ x_{tjkmhi} + \sum_{i'} \sum_{j'} r_{tjkmhi,i',j'} \right\} + S_{ihjt} = \quad (4)$$

$$T_h \cdot R_{ihjt} + S_{ihj(t-1)}$$

when $i \in \alpha_p^c$, $h \in \beta^c$ and $l \in \gamma^c$. j is associated with warehouses, plants or routes where a large concentration of various products or services m is produced, i.e. $j \in v_b$. j refers to all possible warehouses, plants or routes including j.

If initial inventory of secondary resource components exists i.e. $h \in \beta^0$, $T_h \cdot R_{ihjt} = 0$. Spares of secondary resources are used first before additional secondary resources are purchased or leased. If $h \in \beta^1$, $R_{ihjt}$ might have a non-zero positive value.

Primary Resource Components:

The following three equations (5), (6), and (7) are used to determine the number of primary resources, $R_{ijt}$, to be purchased or leased. These three equations are based on three different categories of primary resources ($\alpha_d^c$, $\alpha_o^c$, $\alpha_p^c$) as stated earlier. In each case, $R_{ijt} = 0$ when $i \in (\alpha_d^0, \alpha_o^0, \alpha_p^0)$ i.e. when existing inventory exists in each of the three categories. Spares in the existing inventory are shown in the equations by $S_{ij(t-1)}$ which means that spares of pray resource i are carried from (t-1) period in a warehouse, route or plant j.

Equation (5) determines if standalone primary resource components $i \in \alpha_d^c$ are to be procured and quantities of such components, $R_{ijt}$. The equation also updates the standalone primary resource spares, $S_{ijt}$. Here j represents warehouses, plants or routes where products or services m are produced and distributed on a standalone basis, i.e. $j \in v_d$.

$$x_{tjkmi} + S_{ijt} = T_i \cdot R_{ijt} + S_{ij(t-1)} \text{ when } i \in \alpha_d^c \text{ and } m \in (\rho_g, \rho_f) \quad (5)$$

Equation (6) makes procurement decisions of primary resource components $i \in \alpha_o^c$, which are assembled with tertiary resource components $l \in \gamma_c$ to produce products or services $m \in \rho_g$. $R_{ijt}$ is the number of primary resource components i and $S_{ijt}$ updates spare slots of the primary resource components i at time period t. Here j represents warehouses, plants or routes producing a large concentration of product m at any given time period t.

$$T_l \cdot T_{iljt} + S_{ijt} = T_i \cdot R_{ijt} + S_{ij(t-1)} \text{ when } i \in \alpha_o^c, m \in \rho_g \text{ and } j \in v_b \quad (6)$$

Equation (7) makes the procurement decisions of primary resource components $i \in \alpha_p^c$. The number of primary resource components, $R_{ijt}$, is optimally determined. Each unit of this primary resource components requires single or multiple secondary resource components and tertiary resource components to produce products or services $m \in (\rho_g, \rho_f)$. The equation also updates spares, $S_{ijt}$, from one time period to the next. Here j represents warehouses, plants or routes producing or distributing a large quantities of various products or services m.

$$T_h \cdot R_{ihjt} + S_{ijt} = T_i \cdot R_{ijt} + S_{ij(t-1)} \text{ when } i \in \alpha_p^c, m \in (\rho_g, \rho_f) \text{ and } j \in v_b \quad (7)$$

3. Usage Balance Equation

The equations in this section update the usage quantities of production slots in each type of resources. The left-hand side of the equations comprises of variables such as, demand-driven variables x, rearrangement variables r, usage variables U defining used slots being carried from (t-1) period and relevant sub-components R. The right-hand side of these equations is the variable U symbolizing used production slots at time period t.

Tertiary Resource Components:

Equation (8) updates used production slots of tertiary resource components $l \in \gamma^c$ which are assembled with secondary resource components $h \in \beta^c$ and primary resource components $i \in \alpha_p^c$ to produce products or services $m \in \rho_g$. The demand-driven products or services variables x, rearrangement variables r and used production slots carried from (t-1) period, $U_{ihlj(t-1)}$ are added to derive the used production slots at time period t, $U_{ihljt}$. Here j is warehouses, plants or routes producing or distributing a large concentration of products or services m, i.e. $j \in v_b$. j refers to all possible warehouses, plants or routes including j.

$$\sum_k \sum_{m \in \rho_g} \left\{ x_{tjkmlhi} + \sum_{i' \in \delta} \sum_{j'} r_{tjkmlhi,i',j'} \right\} + U_{ihlj(t-1)} \leq U_{ihljt} \quad (8)$$

Equation (9) updates used production slots of tertiary resource components $l \in \gamma^c$ at each time period to support products or services $m \in \rho_g$. The demand-driven product or service assignment x, rearrangement variables r and used production slots carried from (t-1) period, $U_{ilj(t-1)}$ are added to derive the used production slots at time period t, $U_{iljt}$. In this case, tertiary resource component l is assembled with primary resource component i, and j represents warehouses, plants or routes producing or distributing a large quantities of product or service m.j is all possible warehouses, plants or routes including j.

$$\sum_k \sum_{m \in \rho_g} \left\{ x_{tjkmli} + \sum_{i' \in \delta} \sum_{j'} r_{tjkmli,i',j'} \right\} + U_{ilj(t-1)} \leq U_{iljt} \quad (9)$$

where $i \in \alpha_o$ and $j \in v_b$

Secondary Resource Components:

Equation (10) updates used production slots of secondary resource components $h \in \beta^c$ at each time period to support products or services $m \in (\rho_g, \rho_f)$. The tertiary resource components $R_{ihljt}$, demand-driven service or product assignment x, rearrangement variables r and used production slots carried from (t−1) period, $U_{ihj(t-1)}$ are added to derive the used production slots at time period t, $U_{ihjt}$. In this $$R_{ihljt} + \sum_k \sum_{m \in \rho_f} \left\{ x_{tjkmhi} + \sum_{i'} \sum_{j'} r_{tjkmhi,i',j'} \right\} + U_{ihj(t-1)} \leq U_{ihjt} \quad (10)$$

when $i \in \alpha_p^c$ equation, j represents warehouses, plants or routes producing or distributing a large quantities of products or services m, i.e. $j \in v_b$. j represents all possible warehouses, plants or routes including j.

Primary Resource Components:

The following three equations [(11), (12), (13)] update the used production slots of three different types of primary resource components $\alpha_d^c$, $\alpha_o^c$, $\alpha_p^c$ corresponding to the procurement equations (5), (6) and (7) respectively. The first equation (11) updates usage of primary resource components $\alpha_d^c$ which are standalone primary resource components to produce standalone products or services $m \in (\rho_g, \rho_f)$ $$x_{tjkmi} + U_{ij(t-1)} \leq U_{ijt} \text{ when } i \in \alpha_d^c \text{ and jth warehouse,} \quad (11)$$

plant or route is associated with standalone primary resources, i.e. $j \in v_d$.

Equation (12) updates usage of production slots in primary resource components $\alpha_o^c$ which produce products or services $m \in \rho_g$ jointly with tertiary resource components $l \in \gamma^c$. $R_{iljt}$=number of tertiary resource components l which can be assembled with primary resource components $i \in \alpha_o^c$. Here j represents warehouses, plants or routes producing or distributing a large quantities of product or service m.

$$T_l \cdot R_{iljt} + U_{ij(t-1)} \leq U_{ijt} \text{ where } j \in v_b \quad (12)$$

Equation (13) updates usage of production slots in primary resource components $\alpha_p^c$ which can be assembled with secondary resource components $h \in \beta^c$ to produce products or services $m \in (\rho_g, \rho_f)$.j represents warehouses, plants or routes from where a large concentration of production or distribution can occur for products or services m.

$$T_h \cdot R_{ihjt} + U_{ij(t-1)} \leq U_{ijt} \text{ where } i \in \alpha_p^c \text{ and } j \in v_b \quad (13)$$

4. Product or Service Inventory Equation

Equations (14), (15), (16) and (17) show how inventory of products or services are kept updated. This knowledge of carrying inventory from one time period to another, can be used to rearrange from one primary resource of one plant to another primary resource of another plant or the same plant.

Equation (14) updates inventory of products or services, $m \in \rho_g$, at time period t. These products or services are jointly produced by tertiary resource components, $l \in \gamma^c$, secondary resource components, $h \in \beta^c$, and primary resource components $i \in \alpha_p^c$.j signifies warehouse, plants or routes which can produce or distribute in large quantities of products or services as concentrated production or distribution points. j represents all possible warehouses, plants or routes including j.

$$x_{tjkmlhi} + \sum_{i' \in \delta} \sum_{j'} r_{tjkmlhi,i',j'} + \zeta_{(t-1)jkmlhi} \leq \zeta_{tjkmlhi} \quad (14)$$

where $j \in v_b$

Equation (15) updates inventory of products or services, $m \in \rho_g$, at time period t. These products or services are jointly produced by tertiary resource components, $l \in \gamma^c$, and primary resource components, $i \in \alpha_o^c$.j represents warehouses, plants or routes which can produce or distribute large quantities of products or services at a given time period t as concentrated production or distribution points. j represents all possible warehouses, plants or routes including j.

$$x_{tjkmli} + \sum_{i' \in \delta} \sum_{j'} r_{tjkmli,i',j'} + \zeta_{(t-1)jkmli} \leq \zeta_{tjkmli} \quad (15)$$

where $j \in v_b$

Equation (16) updates inventory of products or services, $m \in \rho_f$, at time period t. This inventory is jointly produced by secondary resource components, $h \in \beta^c$, and primary resource components, $i \in \alpha_p^c$. The equation is made of demand activities x, rearrangement activities r and inventory being carried from (t−1) period i.e. $\zeta_{(t-1)jkmhi}$. In this equation, j represents warehouses, plants or routes producing large quantities of products or services at any given time period t as concentrated production or distribution centers, i.e. $j \in v_b$. j represents all possible warehouese, plants or routes including j.

$$x_{tjkmhi} + \sum_{i' \in \delta} \sum_{j'} r_{tjkmhi,i',j'} + \zeta_{(t-1)jkmhi} \leq \zeta_{tjkmhi} \quad (16)$$

where $m \in \rho_f$ and $i \in \alpha_p^c$

Equation (17) updates inventory of products or services, $m \in (\rho_g, \rho_f)$, produced by standalone primary resource components, $i \in \alpha_d^c$.j, in this case, represents warehouses, plants or routes which are considered to be standalone production or distribution centers.

$$x_{tjkmi} + \zeta_{(t-1)jkmi} \leq \zeta_{tjkmi} \text{ where } m \in (\rho_g, \rho_f), i \in \alpha_d^c \text{ and } j \in v_d \quad (17)$$

5. Product or Service Demand Equation

Equations (18) and (19) capture customer demand, $a_{tkm}$, in the variables x. The subscripts t, k and m refer to time period, customer demand locations and type of products or services respectively. Demand can be distributed across jth warehouse, production plant or route.

$$\sum_j$$

in the left hand side, drives such a distribution mechanism j, here, includes all possible production or distribution centers such as, both concentrated and standalone production or distribution centers i.e. $j \in (v_b, v_d)$. Equation (18) captures demand for products or services, $m \in \rho_g$, which can be produced by any of the three ways as follows: an assembly of tertiary resource components, $l \in \gamma^c$, secondary resource components, $h \in \beta^c$, and primary resource components, $i \in \alpha_p^c$, an assembly of tertiary resource components, $l \in \gamma^c$, and primary resource components, $i \in \alpha_o^c$, and standalone primary resource components, $i \in \alpha_d^c$. The first two ways are related to $j \in v_b$, concentrated production or distribution centers and the last one is related to $j \in v_d$, standalone production, distribution or routes.

$$\sum_{j \in v_b} \left( \underset{i \in \alpha_p^c}{x_{tjkmlhi}} + \underset{i \in \alpha_o^c}{x_{tjkmlhi}} \right) + \sum_{j \in v_d} \underset{i \in \alpha_d^c}{x_{tjkmi}} = a_{tkm} \quad (18)$$

Equation (19) is a set of demand equations related to products or services, $m \in \rho_f$, which are produced by any of the following two ways: an assembly of secondary resource components, $h \in \beta^c$, with primary resource components, $i \in \alpha_p^c$, and standalone primary resource components, $i \in \alpha_d^c$, for $m \in \rho_f$.

$$\sum_{j \in v_b} \underset{i \in \alpha_p^c}{x_{tjkmhi}} + \sum_{j \in v_d} \underset{i \in \alpha_d^c}{x_{tjkmi}} = a_{tkm}$$

where $j \in v_b$ represents concentrated production (19)

or distribution centers, or hubbing routes that are associated with primary resource components $i \in \alpha_p^c$ and $j \in v_d$ represents production or distribution centers, or standalone routes that are associated with standalone primary resource components $i \in \alpha_d^c$.

6. Rearrangement Equation

Equations (20) to (25) set the rearrangement variables so that products or services can migrate from one primary resource of a production plant to another primary resource of another production plant or the same plant at a discrete time period t, if it makes economic sense.

Equation (20) defines the rearrangement equations for products or services $m \in \rho_g$ which require an assembly of tertiary resource components l, secondary resource components h and primary resource components i. Migration occurs from primary resource components í of production plant j́ to primary resource components i of production plant j where j́=j or j́≠j, and both j and j́ belong to $v_b$ i.e. concentrated production or distribution centers.

$$\sum_i \sum_j r_{tjkmlhi,i',j'} \leq \zeta_{(t-1)j'kmlhi'} \quad (20)$$

where $m \in \rho_g, l \in \gamma^c, h \in \beta^c, i \in \alpha_p^c$ and $i' \in \alpha_p^c(\delta)$ Equation (21) defines the rearrangement equations for products or services $m \in \rho_g$ where migration occurs from primary resource components $i \in \alpha_d^c$ of production plant j́ to primary resource components $i \in \alpha_p^c$ of production plant j. The products or services carried by standalone primary resources í of $j́ \in v_d$ migrate to primary resource component i of $j \in v_b$, which requires an assembly of tertiary resource components l and secondary resource components h.$j \in v_b$ in the left-hand side of the equation and $j́ \in v_d$ where j=j́ or j≠j́.

$$\sum_i \sum_j r_{tjkmlhi,i',j'} \leq \zeta_{(t-1)j'kmi'} \quad (21)$$

where $m \in \rho_g, l \in \gamma^c, h \in \beta^c, i \in \alpha_p^c$ and $i' \in \alpha_d^c$ Equation (22) defines the rearrangement variables for products or services, $m \in \rho_g$, which require an assembly of tertiary resource components l and primary resource components i. Products or services, m, roll over from primary resource components í of production plant j́ to primary resource components i of production plant j.

$$\sum_i \sum_j r_{tjkmli,i',j'} \leq \zeta_{(t-1)j'kmli'} \quad (22)$$

where $m \in \rho_g, l \in \gamma^c, i \in \alpha_o^c, i' \in \alpha_p^c(\delta)$ and $j \in v_b$ Equation (23) defines the rearrangement variables for products or services, $m \in \rho_g$, where migration occurs from primary resource components $i \in \alpha_d^c$ of production plant $j́ \in v_d$ to primary resource components $i \in \alpha_o^c$ of production plant j. The products or services carried by standalone primary resources í of production plant $j́ \in v_d$, migrate to primary resource component i of production plant $j \in v_b$, which requires an assembly with tertiary resource components l.$j \in v_b$ in the left-hand side of the equation and $j́ \in v_d$ where (j=j́)∪(j≠j́).

$$\sum_i \sum_j r_{tjkmli,i',j'} \leq \zeta_{(t-1)j'kmi'} \quad (23)$$

where $m \in \rho_g, l \in \gamma^c, i \in \alpha_o^c$ and $i' \in \alpha_d^c$

Equation (24) defines the rearrangement variables for products or services, $m \in \rho_f$, which require an assembly of secondary resource components, $\beta^c$, with primary resource components, $i \in \alpha_p^c$. Products or services, m, roll over from primary resource component í of production plant j́ to primary resource components i of production plant j where (j=j́)∪(j≠j́).

$$\sum_i \sum_j r_{tjkmhi,i',j'} \leq \zeta_{(t-1)j'kmhi'} \quad (24)$$

where $m \in \rho_f, h \in \beta^c, i \in \alpha_p^c, i' \in \alpha_p^c(\delta)$ Equation (25) defines the rearrangement variables for products or services, $m \in \rho_f$, where migration occurs from primary resource components $i \in \alpha_d^c$ of production plant j́ to primary resource components $i \in \alpha_p^c$ of production plant j. The products or services carried by standalone primary resources i of production plant j́, migrate to primary resource component i of production plant j, which requires an assembly with secondary resource components, $h \in \beta^c$.$j \in v_b$ in the left-hand side of the equation and $j́ \in v_d$ where j can be same as j́ or different from j́ i.e., (j=j́)∪(j≠j́).

$$\sum_i \sum_j r_{tjkmhi,i',j'} \leq \zeta_{(t-1)j'kmi'} \qquad (25)$$

where $m \in \rho_f$, $h \in \beta^c$, $i \in \alpha_p^c$ and $i' \in \alpha_d^c$ 7. Decision to rearrange or not to rearrange Equations (26), (27), (28), (29),(30) and (31) are the main drivers of determining if products or services, m, being produced by primary resource components, í, of production plant j need to be rolled over to primary resource component i of production plant j at time period t, or continue to be produced by primary resource components, í. at production plant ĵ.

Equation (26) signifies a decision to rearrange or not to rearrange products or services $m \in \rho_g$ produced by primary resource component, $í \in \alpha_p^c$, at production plant ĵ, together with tertiary resource component l and secondary resource component h. As a result of this rearrangement, products or services m migrate from primary resource component í of production plant ĵ to primary resource component i of production plant j or stay with primary resource component í at production plant ĵ.ĵ ($\phi$) is the set of production plants from where migration takes place to production plant ĵ.

$$\zeta_{tj'kmlhi'} = x_{tj'kmlhi'} + \sum_{i'(\delta)} \sum_{j'(\phi)} r_{tj'kmlhi',i'(\delta),j'(\phi)} + \qquad (26)$$

$$\zeta_{(t-1)j'kmlhi'} - \sum_i \sum_j r_{tjkmlhi,i',j'}$$

where $m \in \rho_g$, $l \in \gamma^c$, $h \in \beta^c$, $j \in v_b$ and $i' \in \alpha_p^c$, but $i' \notin i'(\delta)$ and $i \neq i'$.

Equation (27) signifies a decision to rearrange or not to rearrange products or services, $m \in \rho_g$, being produced by standalone primary resource components $í \in \alpha_d^c$. These products or services, m, can migrate to non-standalone primary resource components $i \in \alpha_p^c$ which require to be assembled with tertiary resource components l and secondary resource components h.

$$\zeta_{tj'kmi'} = x_{tj'kmi'} + \zeta_{(t-1)j'kmi'} - \sum_i \sum_j r_{tjkmlhi,i',j'} \qquad (27)$$

where $j' \in v_d$ and $j \in v_b$.

Equation (28) signifies a decision to rearrange or not to rearrange products or services $m \in \rho_g$ produced by primary resource components, $í \in \alpha_o^c$, together with tertiary resource components, $l \in \gamma^c$. As a result of this rearrangement, products or services m migrate from primary resource components í of production plant ĵ to primary resource component i of production plant j or stay with primary resource component í at production plant or warehouse ĵ.

$$\zeta_{tj'kmli'} = \qquad (28)$$

$$x_{tj'kmli'} + \sum_{i'(\delta)} \sum_{j'(\phi)} r_{tj'kmli',i'(\delta),j'(\phi)} + \zeta_{(t-1)j'kmli'} - \sum_i \sum_j r_{tjkmli,i',j'}$$

where $m \in \rho_g$, $l \in \gamma^c$, $j \in v_b$ and $i' \in \alpha_o^c$, but $i' \notin i'(\delta)$ and $i \neq i'$. $j'(\phi)$ is a set of production plants from where products or services m migrate to production plant ĵ.

Equation (29) signifies a decision to rearrange or not to rearrange products or services, $m \in \rho_g$, being produced by standalone primary resource components $í \in \alpha_d^c$. These products or services, m, can migrate to non-standalone primary resource components $i \in \alpha_o^c$ which require to be assembled with tertiary resource components l where $ĵ \in v_d$ and $j \in v_b$.

$$\zeta_{tj'kmi'} = x_{tj'kmi'} + \zeta_{(t-1)j'kmi'} - \sum_i \sum_j r_{tjkmli,i',j'} \qquad (29)$$

where $i \neq i'$, $i' \in \alpha_d^c$ and $m \in \rho_g$

Equation (30) determines whether or not to roll over products or services, $m \in \rho_f$, from primary resource components $í \in \alpha_p^c$ of production plant ĵ to primary resource component $i \in \alpha_p^c$ of production plant j where $i \neq í$ and $j = ĵ$ or $j \neq ĵ$. These primary resource components, i and í, need to be assembled with secondary resource component, $h \in \beta^c$.

$$\zeta_{tj'kmhi'} = \qquad (30)$$

$$x_{tj'kmhi'} + \sum_{i'(\delta)} \sum_{j'(\phi)} r_{tj'kmhi',i'(\delta),j'(\phi)} + \zeta_{(t-1)j'kmhi'} - \sum_i \sum_j r_{tjkmhi,i',j'}$$

where $m \in \rho_f$, $j \in v_b$, $h \in \beta^c$ and $i' \in \alpha_p^c$, but $i' \notin i'(\delta)$ and $i \neq i'$. $j'(\phi)$ is a set of warehouses, production plants or routes from where products or services migrate to warehouse, production plant or route ĵ.

Equation (31) determines whether or not to roll over products or services, $m \in \rho_f$ from standalone primary resource components, $í \in \alpha_d^c$, of production plant ĵ to primary resource component $i \in \alpha_p^c$, of production plant j, which need to be assembled with secondary resource component, $h \in \beta^c$ where $ĵ \in v_d$ and $j \in v_b$.

$$\zeta_{tj'kmi'} = \qquad (31)$$

$$x_{tj'kmi'} + \zeta_{(t-1)j'kmi'} - \sum_i \sum_j r_{tjkmhi,i',j'} \text{ when } i \neq i' \text{ and } m \in \rho_f$$

8. Initial Inventory When t=0:

Tertiary Resource Components:

The equation (32) stores spare quantities, $E_{ihljt}$, of tertiary resource units, l, that can be assembled with secondary resource components, h, and primary resource components, $i \in \alpha_p^c$. The variables under which spare quantities are stored, are $S_{ihljt}$.

$$S_{ihljt} = E_{ihljt} \text{ where } t=0 \text{ and } j \in v_b \qquad (32)$$

The equation (33) stores the used quantities, $F_{ihljt}$ of tertiary resource units, l, that can be assembled with secondary resource components, h, and primary resource components, $i \in \alpha_p^c$. The variables under which used quantities are stored, are $U_{ihljt}$.

$$U_{ihljt} = F_{ihljt} \text{ where } t=0 \text{ and } j \in vb \qquad (33)$$

The equation (34) stores spare quantities, $E_{iljt}$, of tertiary resource units, l, that can be assembled with primary resource components, $i \in \alpha_o^c$. The variables under which spare quantities are stored, are $S_{iljt}$.

$$S_{iljt} = E_{iljt} \text{ where } t=0 \text{ and } j \in v_b \qquad (34)$$

The equation (35) stores the used quantities, $F_{iljt}$ of tertiary resource units, l, that can be assembled with primary resource components, $i \in \alpha_o^c$. The variables under which used quantities are stored, are $U_{iljt}$.

$$U_{iljt} = F_{iljt} \text{ where } t=0 \text{ and } j \in v_b. \quad (35)$$

Secondary Resource Components:

The equation (36) stores spare quantities, $E_{ihjt}$, of secondary resource units, h, that can be assembled with primary resource components, $i \in \alpha_p^c$. The variables under which spare quantities are stored, are $S_{ihjt}$.

$$S_{ihjt} = E_{ihjt} \text{ where } t=0 \text{ and } j \in v_b. \quad (36)$$

The equation (37) stores the used quantities, $F_{ihjt}$ of secondary resource units, h, that can be assembled with p resource components, $i \in \alpha_p^c$. The variables under which used quantities are stored, are $U_{ihjt}$.

$$U_{ihjt} = F_{ihjt} \text{ where } t=0 \text{ and } j \in v_b. \quad (37)$$

Primary Resource Components:

The equation (38) stores spare quantities, $E_{ijt}$ of primary resource units, $i \in (\alpha_d^c, \alpha_o^c, \alpha_p^c)$. The variables under which spare quantities are stored, are $S_{ijt}$.

$$S_{ijt} = E_{ijt} \text{ where } t=0 \text{ and } j \in (v_b, v_d) \quad (38)$$

The equation (39) stores used quantities, $F_{ijt}$ of primary resource units, $i \in (\alpha_d^c, \alpha_o^c, \alpha_p^c)$. The variables under which used quantities are stored, are $U_{ijt}$.

$$U_{ijt} = F_{ijt} \text{ where } t=0 \text{ and } j \in (v_b, v_d) \quad (39)$$

9. Non-negativity and Integer Constraints:

The equation (40) defines that vectors, $\bar{x}, \bar{r}, \bar{R}, \bar{S}, \bar{U},$ and $\bar{\xi}$ non-negative, $\bar{x}, \bar{r}$ and $\bar{R}$ are integer variables and the remaining variables are positive and continuous.

$$\bar{x} \geq 0, \bar{r} \geq 0, \bar{R} \geq 0, \bar{S} \geq 0, \bar{U} \geq 0, \bar{\xi} \geq 0, \text{ and } \bar{x}, \bar{r} \text{ and } \bar{R} \text{ are integers} \quad (40)$$

Figure 2:
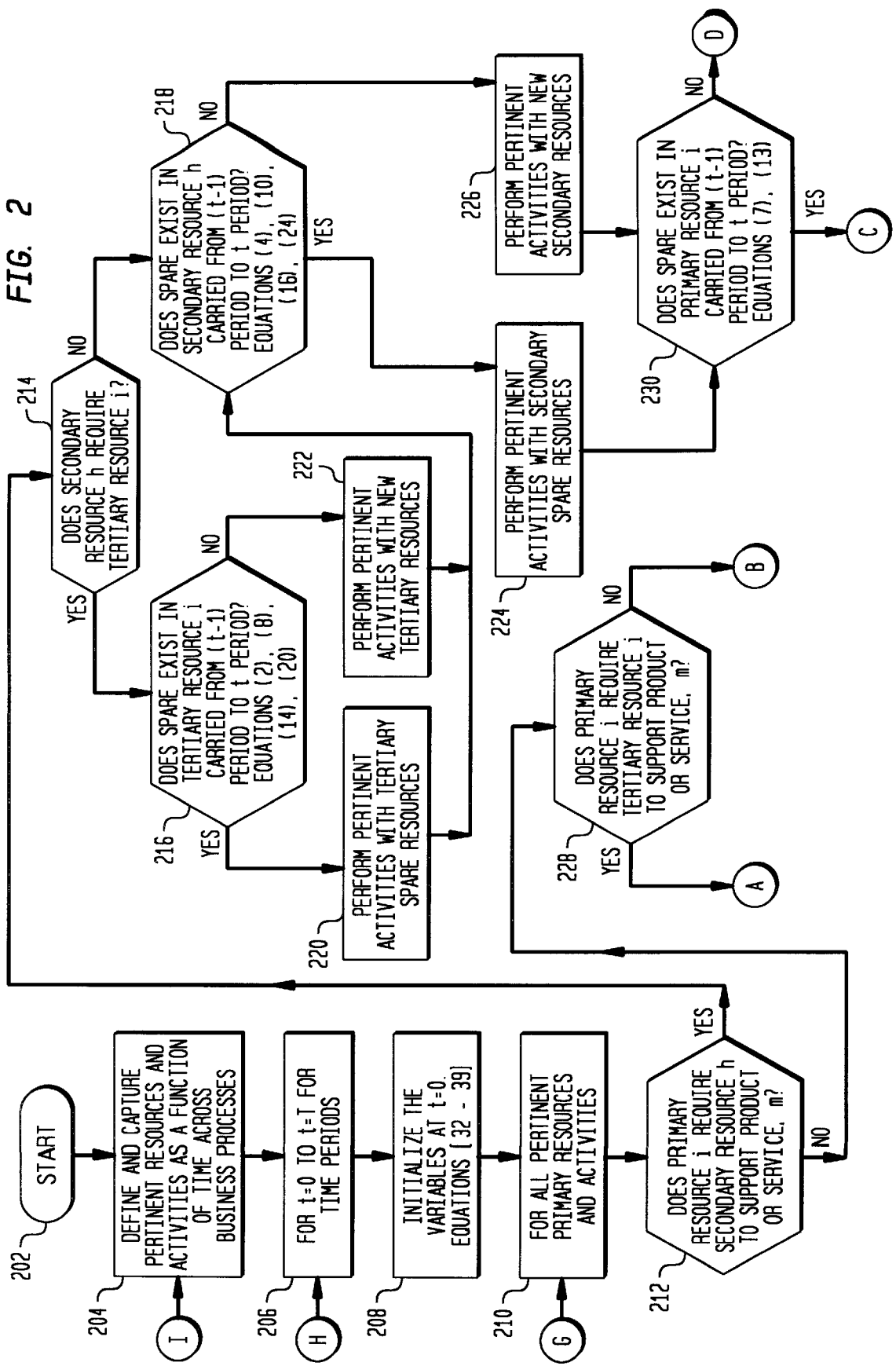
FIGS. 2–4 is a flowchart depicting methods of operation as contemplated by some embodiments of the present invention.
Figure 3:
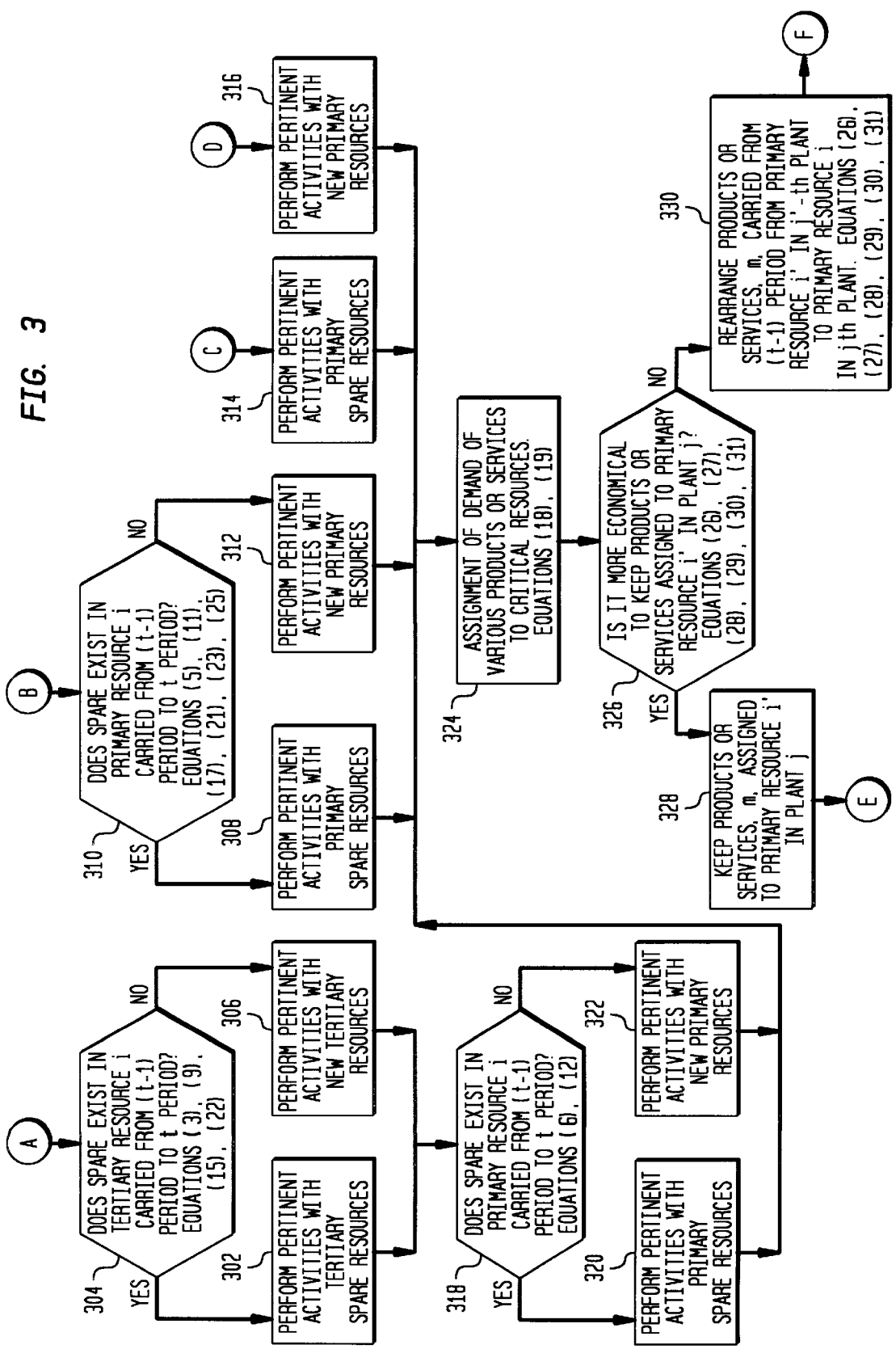
Figure 4:
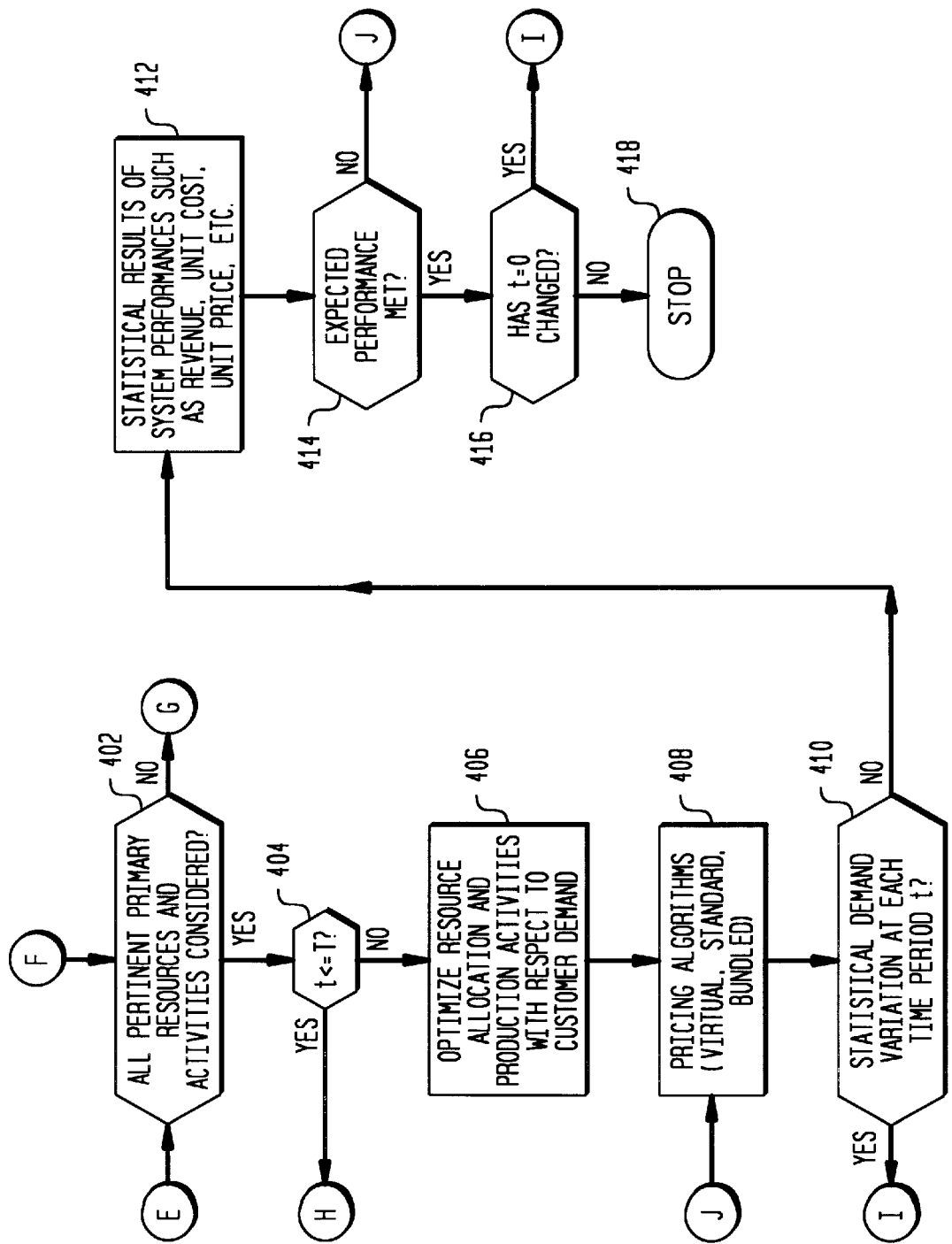

Methods contemplated by some embodiments of the present invention with relation to the above-noted equations are now described with regard to FIGS. 2–4. Referring first to FIG. 2, pertinent resources and activities (for example, customer demand and available/requested equipment) are captured as a function of time across business processes (that is, they are captured across the plurality of time periods and across the marketing, procurement and production processes), as indicated by a block 204. Then, the procedure that follows below is implemented across the various time periods, as indicated by a block 206.

The next step is that various variables at T=0 are initialized (using equations 32–39) as indicated by a block 208. Also, at this point, it is assumed that a decision has been made concerning which resources are ranked as, for example, primary, secondary, and tertiary. Then, for all pertinent primary resources and activities (as indicated by a block 210) a determination is made as to whether a given primary resource (e.g., a DS3 line) requires a secondary resource (e.g., a DS3 multiplexer) to support a product or service, M (e.g., the A1.5 service), as indicated by a block 212. If the answer is "yes," a determination is then made as to whether the secondary resource requires tertiary resource 1 to support the product or service, as indicated by a block 214. If it does, then a determination is made as to whether a "spare" one of those tertiary resources 1 exist that can be carried over from the resources existing in time period t−1 to the current time period t at issue. This is determined using equations 2, 8, 14 and 20, as indicated by a block 216. If a "spare" does exist, then the pertinent activities are performed using that resource, as indicated by a block 220. If not, then it is performed using a new resource.

It should be realized that the definition of "spare" resource needs to be decided upon in some way (e.g., whether it means that the resource is available immediately, locally, from a nearby factory, etc). Thus, the line of demarcation between a spare and a new resource needs to be determined depending upon the current environment. For example, any resource currently in the possession of a business either due to lease or purchase can be defined as spare if the resource is idle. Any new order that is coming from suppliers (outside the business) can be defined as a new resource.

Whether or not the answer to block 214 is yes or no, reaching that block in the first place meant that a determination had already been made that the answer to block 212 was yes, and thus in either case a determination needs to be made as to whether a "spare" exists in secondary resource h that can be carried from the previous time period t−1 to the current one, using equations 4, 10, 16 and 24 as indicated by a block 218. Again, if a spare exists, pertinent activities are performed with that secondary spare resource, as indicated by a block 224, and otherwise performed with a new resource, as indicated by a block 226.

Similar determinations occur with for the remaining possible combinations of dependencies, as indicated by blocks 228–322. shown on FIGS. 2 and 3. The next step after those blocks, in all cases, is to assign various resources in accordance with the demand, as a result of the analysis given in the previous boxes of the flowchart. This is done using equations 18 and 19, as indicated by a block 324 on FIG. 3. Then, a determination is made as to whether it is more economical to keep the products or services assigned to the primary resources. This is determined using equations 26–31, as indicated by a block 326. If it is more economical, the products or services remain assigned as they were, as indicated by a block 328. Otherwise, a rearrangement of products or services is made, again using equations 26–31, as indicated by a block 330.

Referring now to FIG. 4, the next step is to determine whether all pertinent primary resources and activities have been considered. This is a kind of "sanity check" to make sure all was covered. This is indicated by a block 402.

Decision block 404 indicates that the above-noted analysis needs to be implemented for each time period t. Once that is done, the various systems implemented during the various time periods are further optimized, as indicated by a block 406. This could be done in any number of ways, for example, using an integer programming solver using CPLEX (made by CPLEX optimization, Inc. of Incline Village, Nev.) or using heuristic techniques.

The next step is that various pricing algorithms are used to determine "favorable" pricing of the various services over the time periods t, in view of such factors as availability. Algorithms exist for doing this, such as the virtual pricing techniques described in U.S. Pat. No. 5,270,921, which is incorporated by reference herein.

The next step is to determine whether there may be too much variation in demand between each time period t since the last analysis due to pricing effects on the market. If there is, then optimize the system again. Multiple runs of all the previous steps need to be performed starting from box 204 if there are multiple times of demand changes in a period at which the system is being optimized for future periods.

The next step is to determine whether a price-performance mark has been met, as indicated by blocks 412 and 414.

Lastly, a determination is made as to whether the reference T=0 has changed, in which case the analysis would have to be re-performed) as indicated by a block 416).

Of course, it should be understood that FIGS. 2–4 and the associated description above is merely by way of example, and that the present invention contemplates any number of different configurations, additional steps and/or sequence of steps as depicted.

As a specific example of usage of the present invention, the invention was applied to test the procurement process, production process and marketing process of AT&T's access network at a prototype level. The inventory of access network facilities and equipment changes over time due to rise of demand in one service and decline in another, introduction of new technology and changes in customer demographics. Three different services, ASDS (Accunet Spectrum Digital Services), Accunet T1.5 (supporting dedicated T1.5 service) and NODAL T1.5 (supporting business switched services such as, SDN, 800, etc.) were used to test this model. The other services such as, CCS (consumer communications services) can also be supported and new services can be added. At the present time, AT&T leases facilities and network equipment from regional bell operating companies (RBOCs) to provide customers access to its long distance network. It also returns facilities to bell companies when these facilities are not needed. In addition, migration of these services from standalone facilities to high cap or from one high cap to another high cap is needed to manage the network costs effectively, and thereby maximize the asset utilization and revenue. Flow of materials between AT&T and its vendors, and within AT&T's production and marketing processes can best be optimized by a dynamic optimization technique.

A time-variant dynamic systems model can best mimic this flow of materials across business processes as a function of time. The model makes optimal decisions of procurement process, production process and marketing process at discrete time periods. The technique was applied to one-level hubbing architecture in the AT&T access network. It is assumed that the intermediate hubbing architecture would be solved from the solution of the one-level hubbing problem.

In a one-level hubbing scenario, multiple LEC (local exchange carriers) offices are considered to be demand locations. It is assumed that demand of different telecommunication services originating at these locations is destined to multiple AT&T serving offices via a route j. In a one-level hubbing scenario, a route vector consists of direct routes i.e., between k demand location and AT&T serving offices and via-routes (i.e., demand from k location might be routed to an AT&T serving office via another LEC office, a potential hub candidate). Rearrangement activities can take place to maintain the optimum state of the network. Three services, previously mentioned, are produced by leasing standalones, or high cap facilities (e.g. T1.5 carrying DS0, DS3 or DS3's carrying both DS0 channels and DS1 channels). If the circuits are leased standalones over time and reach break-even with T1.5 or the lowest cost DS3 alternative, the standalones get rolled over to T1.5 or DS3 at that time. If the circuits are routed via a LEC hub-AT&T POP pair, j, in one time period, they might migrate to a higher level capacity in the same jth route, or another jth route, provided sufficient growth exists and cost-optimality criteria is satisfied.

The Pacific Bell territory has been chosen for this study. FIG. 5 shows different access alternatives available in the Pacific Bell tariff. T1 multiplexers are considered to be tertiary resource components when they are cascaded into DS3 multiplexers to support the ASDS (DS0 type service). However, a T1 multiplexer is also used in conjunction with a T1 facility, designated as a "primary" resource component. DS3 multiplexers are secondary resource components which are cascaded into high cap DS3 facilities to support ACCUNET T1.5 and NODAL T1.5 services. High capacity facilities are of different types, and come in n different numbers of DS3 packs (nxDS3) or T1.5 facility. T1.5, 1xDS3, 3xDS3 and 12xDS3 were used as primary resource components in this study in addition to standalone options. These types of resources might be available as initial inventory in the existing access network of AT&T, an important input to a multi-period dynamic systems model.

FIGS. 6a–c account for possible migration activities of services among primary resources. The column i is the primary resource where services from primary resource i would migrate to. In a growth situation, migration of asds, accunet and nodal can occur from standalones or lower capacity facility to higher capacity facility. The reverse is true with respect to declining demand of a service. However, this model currently addresses growth only and can be easily modified to include declining demand within the same mathematical principles.

Figure 7:
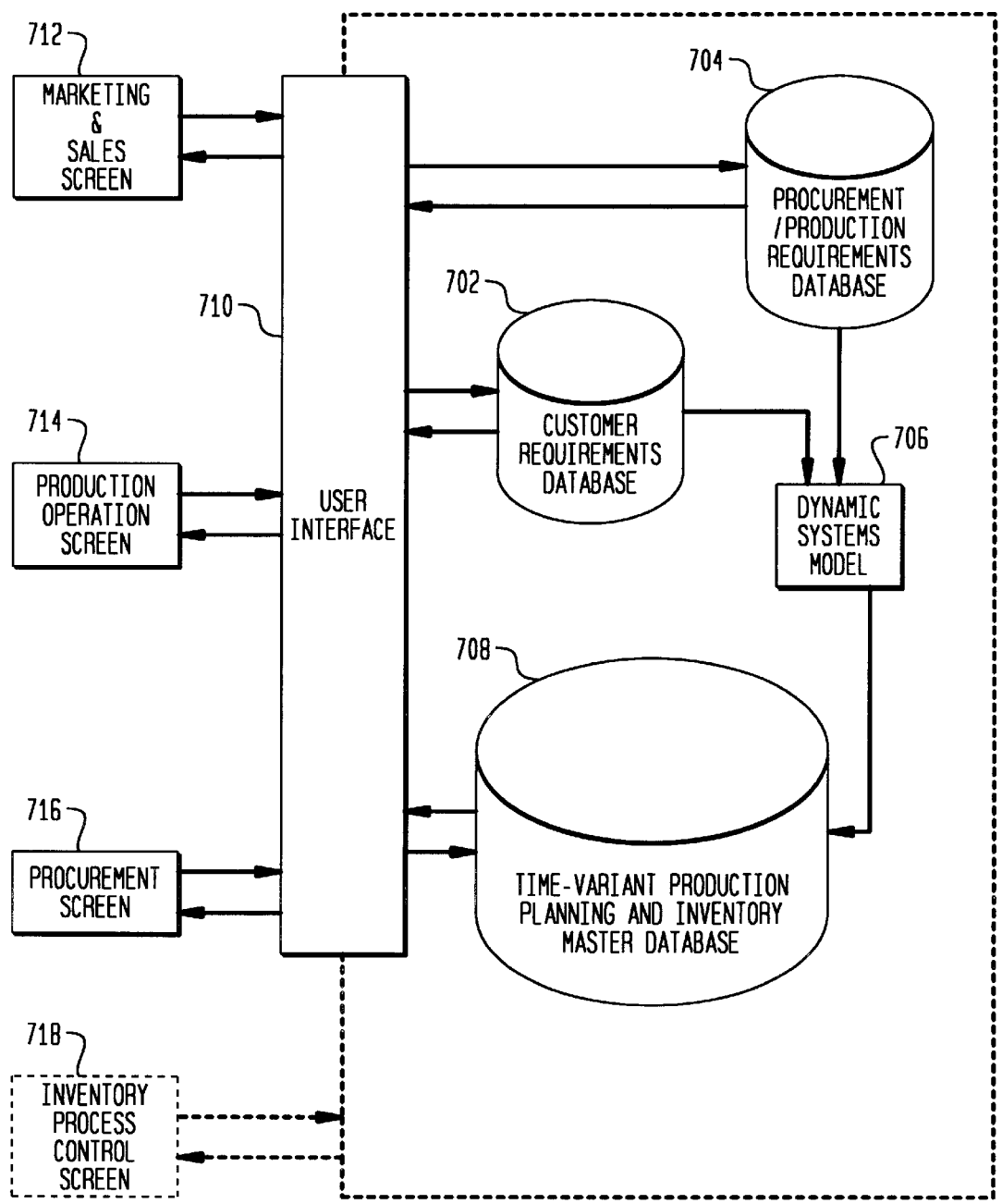
FIG. 7 is a block diagram of software components and interfaces as contemplated by some embodiments of the present invention.

FIG. 7 displays some embodiments contemplated by the present invention of a high-level software architecture for deploying dynamic resource allocation techniques. In the example depicted by this figure, the marketing and sales force is required to gather customer-specific requirements and store them in a customer requirements database 702. These requirements are time-dependent and so they should be time-tagged. Customer demand, product or service specific features and customer expected arrival time or departure time are some of these requirements.

The procurement process is required to gather vendor-specific resources or technology alternatives and their costs. The production process is required to gather production-related requirements and their costs. This information should be stored in a procurement/production database 704. In addition, the procurement process should identify possible warehouse or plant locations. For example, in telecommunication industry they are the local serving offices, network concentration locations or AT&T POPS. This information should also be time-tagged based on their availability.

A dynamic systems model 706 is contemplated to contain the facilities and various modules by which the above-noted equations can be implemented. Some embodiments of the present invention contemplate that this implementation can utilize the C programming language making use of CPLEX callable libraries. Of course, it should be understood that any number of programming languages and libraries can also be used.

The dynamic systems model 706 takes both the customer requirements from marketing and sales, production operation requirements from the production process and the procurement requirements from procurement as its input. The model then creates time-variant optimum results which are stored in a master database 708. The optimum procurement results are sent to the vendors for order processing. The yield management information is accessed by marketing and sales for product or service sales. The production process takes the optimum production schedule to assure that it produces finished products just-in time for delivery to customers. The input-and output to and from the marketing, production, procurement (and inventory control) entities is done through user interface 710 and screens 712–718.

Figure 8:
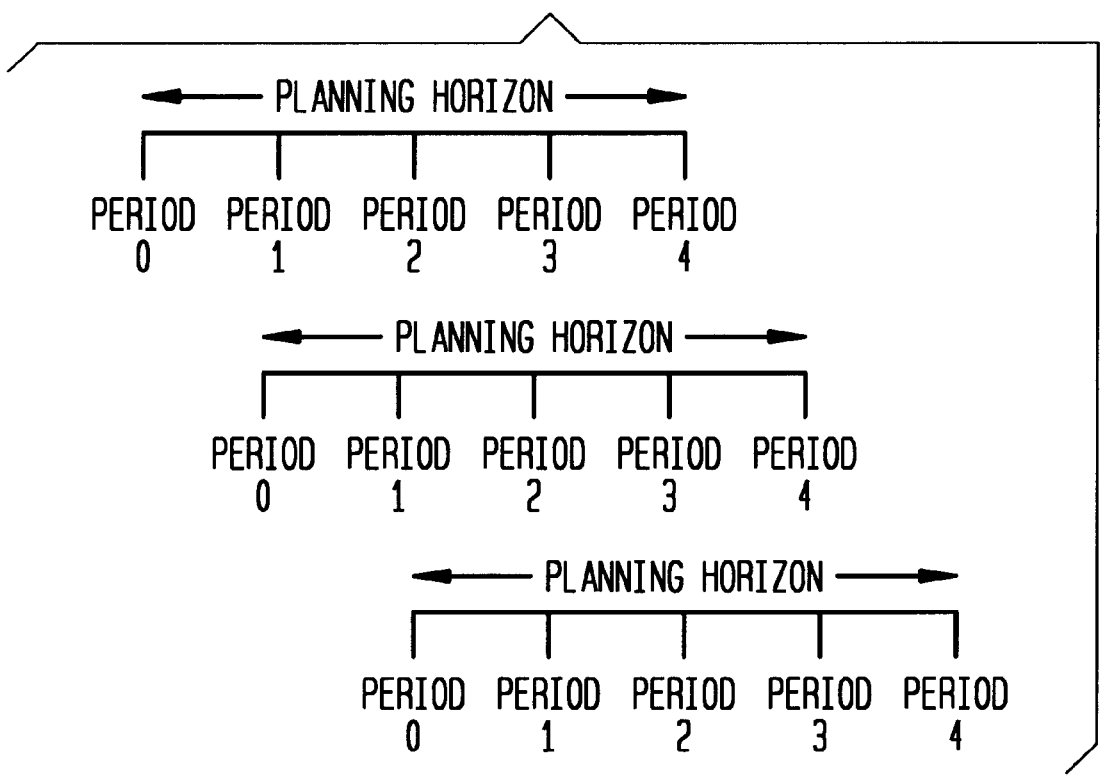
FIG. 8 depicts a moving horizon chart.

The whole cycle of optimization run is repeated based on a moving horizon policy to keep the inventory at optimum state. In a moving horizon policy, an optimization cycle gets repeated at the current time period (period 0) of the moved horizon as illustrated in FIG. 8.

Figure 9:
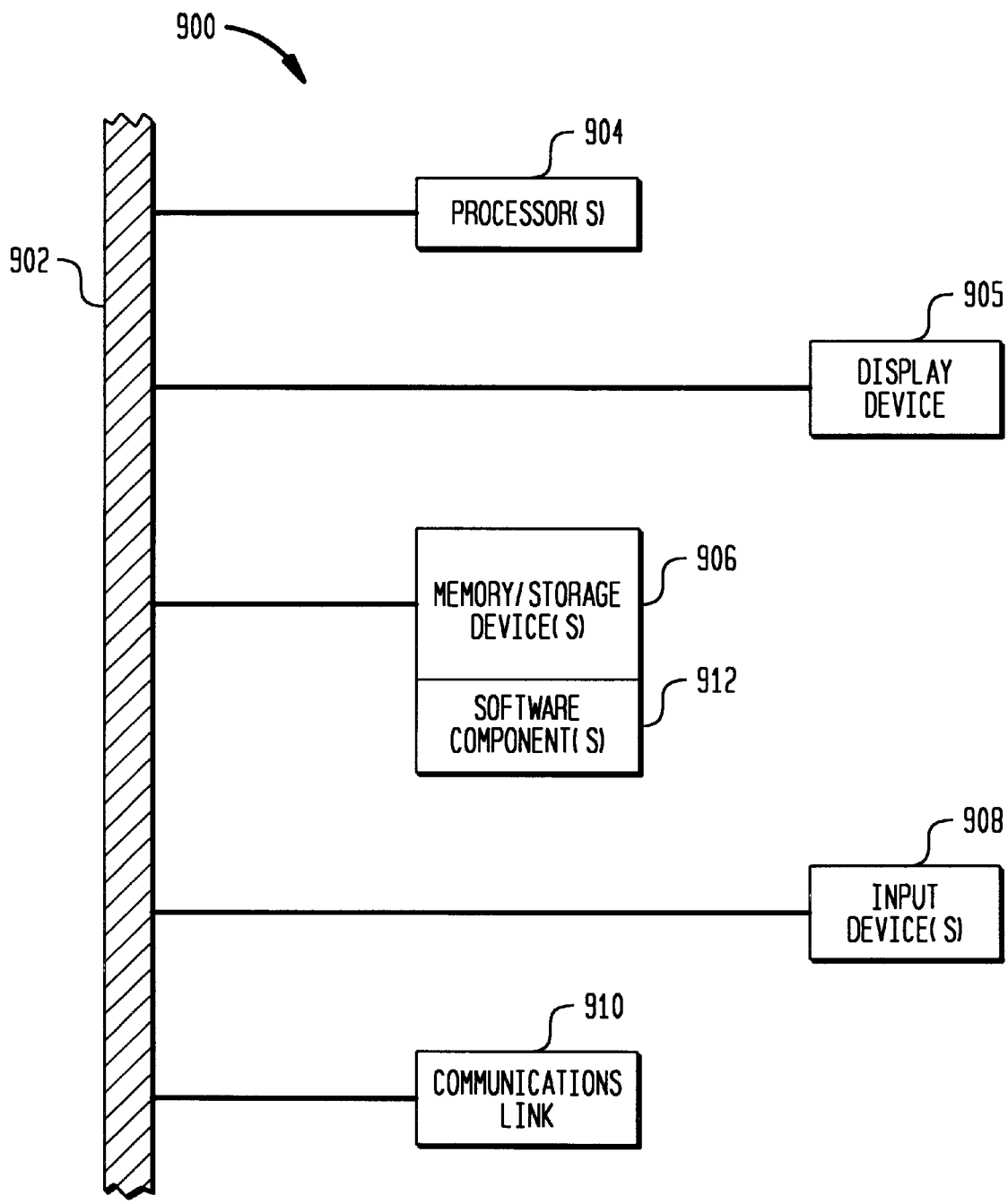
FIG. 9 is a block diagram of a computer environment and components thereof as contemplated by some embodiments (and environments thereof) of the present invention.

Example of hardware environments as contemplated by some embodiments of the present invention are now discussed with regard to FIG. 9. Referring to FIG. 9, a computer environment 900 shown can be a single or multiple-user environments, and can utilize one or more processors. In addition, computer environment 900 can be of any number of computer types, including microcomputers, workstations, minicomputers, mainframes and massively parallel processing computers. Examples of microcomputers/workstations include the IBM PC manufactured from IBM Corporation of Armonk, N.Y., the Macintosh from Apple Computer and the SGI R4400 by Silicon Graphics of Mountain View, Calif.; Examples of minicomputers include the VAX 750 from Digital Equipment Corporation of Maynard, Mass. and the AS/400 from IBM Corporation; an example of a mainframe is the System-390 series from IBM; and an example of a massively parallel processing computer is the Cray T3D from Cray Research of Eagan, Minn. Of course, any number of other types of computer systems are also contemplated for use with the present invention. Also, the present invention contemplates that two or more of such computer environments can be linked and used together.

In addition, any number of operating systems can be used with regard to the computer environment used with the present invention, including any of the various versions of Unix, VMS from Digital Equipment, OS/2 from IBM and/or DOS or Windows from Microsoft Corporation of Redmond, Wash., or the Macintosh OS from Apple Computer.

Still referring to FIG. 9, some embodiments of the present invention contemplate that some type of communications link such as a bus 902 allows various components of the computer environment 900 to communicate. As shown, one or more processor(s) 904 are in communication with bus 902. Some embodiments of the present invention contemplate that the processor(s) 904 can be those typically found in the computers mentioned above, or they can be any number of other types of processor(s). For example, with regard to microcomputers, any of the Intel 80X86 series, Pentium or any other CPU developed in Intel's future line of processors are contemplated.

Also in communication with bus 902 is a display device 905. This can be any type of display device capable of displaying video information, and can also act as an input device where a touch screen is used.

Memory/storage device(s) 906 is also shown as being in communication with bus 902. Some embodiments of the present invention contemplate that the memory/storage device(s) 906 could be any number of different types of transient, permanent or semi-permanent computer-readable mediums for storing information, including RAM, ROM, EPROM, magnetic, electronic, atomic or optical (including holographic) storage, some combination thereof, etc. Software component(s) 912 are shown as being associated with memory/storage 906. In addition, some embodiments of the present invention also contemplate that the computer-readable medium could include any type of transmission scheme for communicating information.

The precise nature of software component(s) 912 are envisioned to vary depending upon the function and location with which the associated computer environment 900 is used. Some embodiments of the present invention contemplate that they would include the dynamic systems model 706 and databases 702, 704 and 708.

One or more input devices 908 are also envisioned to be associated with computer environment 900. Any number of different types of input devices such as a mouse, keyboard, etc., can be used.

In addition, a communications link 910 is also shown as being in communication with bus 902. This can be used, for example, to communicate with marketing and/or production and/or procurement sites, where any of them are at a remote location from the computer environment 900.

It should be understood that FIG. 9 and the associated description above is merely an example, and that the present invention contemplates any number of different configurations and/or different components as well.

In general, it should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using the C or C++ programming languages.

It is also to be appreciated and understood that the specific embodiments of the invention described hereinbefore are merely illustrative of the general principles of the invention. Various modifications may be made by those skilled in the art consistent with the principles set forth hereinbefore.

What is claimed is:

1. A computer-implemented method for allocating available communication system resources used within a communication system over a plurality of time periods t, comprising the steps of:

(1) receiving at a computer, communication system resource requirements required for each of the plurality of time periods t;

(2) receiving at said computer, communication system resource availability information indicating anticipated communication system resource availability during each of the plurality of time periods t;

(3) configuring communication system resources at each time period t based upon said steps (1) and (2) so as to match communication system resources to communication system resource demands during each time period t, wherein the communication system resources used at each time period t are interdependent with the other plurality of time periods;

(4) assigning to a plurality of communication system resources of said communication system, prices determined using a virtual pricing technique, to be charged to use said plurality of communication system resources during said plurality of time periods t, said prices being based upon availability of the communication system resources at each time period t; and (5) delivering to customers of said communication system resources, said communication system resources at said prices during said plurality of time periods t.

2. The computer-implemented method of claim 1, wherein step (3) comprises, the steps of:

(a) determining, for said available communication system resources, which of all available communication system resources are classified as primary and secondary communication system resources;

(b) determining which of said secondary communication system resources are required in conjunction with said primary communication system resources to provide said available communication system resources;

(c) for each of said required secondary communication system resource, determining whether said secondary communication system resource is available at each time period t; and (d) for each primary communication system resource, determining whether the primary communication system resources are available at each time period t.

3. The computer-implemented method of claim 2 further comprising the steps of:

(e) determining which available communication system resources can be classified as tertiary communication system resources;

(f) determining which tertiary communication system resources are required in conjunction with said primary communication system resources or said secondary communication system resources, to provide said available communication system resources over a plurality of time periods t; and (g) for each of said required tertiary communication system resource, determining whether said tertiary communication system resource is available.

4. The computer-implemented method of claim 3, wherein step (g) comprises the step of:

(i) determining amounts of the tertiary communication system resources in inventory that can be assembled with primary and secondary communication system resources.

5. The computer-implemented method of claim 3, wherein step (g) comprises the step of:

(i) determining amounts of the secondary communication system resources in inventory that can be assembled with primary communication system resources.

6. The computer-implemented method of claim 1, wherein step (3) comprises the step of:

(a) determining the lowest cost for providing the communication system resources by minimizing an objective function.

7. The computer-implemented method of claim 1, wherein step (2) comprises the step of:

(a) determining the optimal amount of communication system resources to be purchased or leased.

8. The computer-implemented method of claim 7, wherein step (2) further comprises the step of:

(b) determining the required number of tertiary resource components required to support a communication service.

9. The computer-implemented method of claim 8, wherein step (2) further comprises the step of:

(c) determining the number of tertiary resource components which can be assembled with primary resource components.

10. The computer-implemented method of claim 9, wherein step (2) further comprises the step of:

(d) determining the number of secondary resource components which can be assembled with primary resource components.

11. The computer-implemented method of claim 7, wherein step (2) further comprises the step of:

(b) determining the number of primary resource components to be purchased or leased.

12. The computer-implemented method of claim 1, wherein step (2) comprises the step of:

(a) determining usage of each of the communication system resources.

13. The computer-implemented method of claim 12, wherein step (a) includes the step of determining the usage of resource components selected from the group consisting of tertiary, secondary and primary resource components.

14. The computer-implemented method of claim 1, wherein step (2) comprises the step of:

(a) determining amounts of the communication system resources in inventory for a plurality of time periods t.

15. The computer-implemented method of claim 1, wherein step (1) comprises the step of:

(a) determining customer demand for the communication system resources.

16. The computer implemented method of claim 15, wherein step (a) includes the step of determining customer demand based on variables selected from the group consisting of time period, customer demand locations, type of product, and type of service.

17. The computer-implemented method of claim 1, wherein step (3) comprises the step of:

(a) determining which communication system resources can be rearranged from one location to another.

18. The computer-implemented method of claim 17, wherein step (3) further comprises the step of:

(b) determining whether to rearrange the communication system resources.

19. The computer-implemented method of claim 1, wherein:

step (1) comprises the step of (a) determining customer demand for the communication system resources;

step (2) comprises the steps of (a) determining usage of each of the communication system resources; and (b) determining amounts of the communication system resources in inventory; and step (3) comprises the steps of (a) determining the lowest cost for providing the communication system resources by minimizing an objective function; (b) determining the optimal amount of communication system resources to be purchased or leased; (c) determining which communication system resources should be rearranged from one location to another; and (d) determining whether to rearrange the communication system resources.

20. A computer-readable medium for allocating communications system resources of a communication system over a plurality of time periods t, comprising:

a first module of computer program instructions, within a computer, receiving communication system resource requirements information for each of the plurality of time periods t;

a second module of computer program instructions receiving communication system resource availability information indicating anticipated communication system resource availability during each of the plurality of time periods t;

a third module of computer program instructions configuring the communication system resources of a communication system at each time period t to match communication system resources to communication system resource demand based upon input information from said first and second modules received by said third module wherein the communication system resources of a communication system are used at each time period t are interdependent with the other plurality of time periods t; and a fourth module of computer program instructions assigning a price to use the communication system resources of said communication system based at least upon availability of the communication system resources at each time period t.

21. The computer-readable medium of claim 20, wherein said third module comprises, at each time period t:

a fifth module of computer program instructions determining which communication system resources can be classified as primary and secondary communication system resources;

a sixth module of computer program instructions wherein said sixth module determines which of said secondary communication system resources are required in conjunction with said primary communication system resources, to provide said communication system resource;

a seventh module of computer program instructions, wherein said seventh module determines, for each of said required secondary communication system resource, whether said secondary communication system resource is available; and an eighth module of computer program instructions, wherein said eighth module determines, for each of said primary communication system resource, whether the primary communication system resource is available.

22. The computer-readable medium of claim 21 further comprising:

a ninth module of computer program instructions, determining which communication system resources can be classified as tertiary communication system resources;

a tenth module of computer program instructions, determining which of said tertiary communication system resources are required in conjunction with said primary communication system resources or said secondary communication system resources to provide said communication system resources; and an eleventh module of computer program instructions, determining for each of said required tertiary communication system resource, whether said tertiary communication system resource is available.

23. A machine for allocating and pricing communication system resources of a communication system over a plurality of time periods t, comprising:

first means for receiving communication system resource requirements required by said communication system in each of the plurality of time periods t;

second means for receiving communication system resource availability information indicating anticipated communication system resource availability in said communication system during each of the plurality of time periods;

third means for configuring a communication system at each time period t based upon signals from said first and second means, wherein the communication system resources of said communication system used at each time period t are interdependent with the other plurality of time periods; and fourth means for assigning a price to said communication system resources based upon a virtual pricing technique, including the availability of the communication system resources at each time period t.

24. The machine of claim 23, wherein said third means comprises, at each time period t:

fifth means for determining, which communication system resources can be classified as primary and secondary communication system resources;

sixth means for determining which of said secondary communication system resources are required, in conjunction with said primary communication system resources;

seventh means for determining, for each said required secondary communication system resource, whether said secondary communication system resource is available; and eighth means for determining, for each primary communication system resource, whether the primary communication system resource is available.

25. The machine of claim 24, further comprising:

ninth means for determining which communication system resources can be classified as tertiary communication system resources;

tenth means for determining which of said tertiary communication system resources are required, in conjunction with said primary communication system resources or said secondary communication system resources, to provide said communication service; and eleventh means for each said required tertiary communication system resource, determining whether said tertiary communication system resource is available.

* * * * *